(12) United States Patent
    Ishizuka et al.

(10) Patent No.: US 9,538,032 B2
(45) Date of Patent: Jan. 3, 2017

(54) IMAGE READING APPARATUS

(71) Applicant: CANON KABUSHIKI KAISHA, Tokyo (JP)

(72) Inventors: Haruo Ishizuka, Ichikawa (JP); Masahiro Kawanishi, Yokohama (JP); Kuniaki Sato, Inagi (JP); Toshihide Wada, Yokohama (JP); Kazuyuki Morinaga, Machida (JP); Makoto Takemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/820,002

(22) Filed: Aug. 6, 2015

(65) Prior Publication Data
    US 2016/0057300 A1    Feb. 25, 2016

(30) Foreign Application Priority Data

Aug. 22, 2014  (JP) ................. 2014-169768

(51) Int. Cl.
    *H04N 1/04*    (2006.01)
    *H04N 1/00*    (2006.01)
    *H04N 1/028*   (2006.01)

(52) U.S. Cl.
    CPC ...... *H04N 1/00559* (2013.01); *H04N 1/00557* (2013.01); *H04N 1/028* (2013.01)

(58) Field of Classification Search
    CPC ............... B65H 5/062; B65H 2801/39; B65H 2402/441; B65H 3/0684; B65H 5/26; B65H 2301/3122; B65H 2405/115; H04N 2201/0081; H04N 1/193; H04N 1/12; H04N 1/00005; H04N 1/00702; H04N 1/00013; H04N 1/00
    USPC ....... 358/474, 496, 498, 461, 497, 406, 448, 358/463; 271/245, 273, 274, 207, 209, 271/220, 225, 226, 227, 228, 242, 243, 271/244, 246, 249, 256, 264, 268, 303, 271/3.14, 9.13
    See application file for complete search history.

(56) References Cited

U.S. PATENT DOCUMENTS

| 5,281,803 A | 1/1994 | Ishizuka ................. 250/208 |
| 5,517,329 A | 5/1996 | Ishizuka ................. 358/474 |
| 5,633,732 A | 5/1997 | Ishizuka ................. 358/474 |
| 5,910,811 A * | 6/1999 | Sato ..................... B41J 13/10 347/104 |
| 6,204,936 B1 | 3/2001 | Ishizuka ................. 358/474 |
| 6,246,491 B1 * | 6/2001 | Matsumoto ........ H04N 1/00567 358/401 |
| 6,801,344 B2 | 10/2004 | Morinaga et al. .......... 358/474 |
| 7,088,475 B1 | 8/2006 | Terashima et al. ......... 358/448 |
| 7,715,779 B2 * | 5/2010 | Kondo ............... H04N 1/00846 358/2.1 |
| 7,847,982 B2 * | 12/2010 | Mizumukai ........ H04N 1/00572 358/400 |
| 8,059,313 B2 * | 11/2011 | Nako ................... G03G 21/043 358/1.18 |
| 8,072,653 B2 | 12/2011 | Iwata et al. ............. 358/474 |

(Continued)

FOREIGN PATENT DOCUMENTS

JP       2011-211479       10/2011

*Primary Examiner* — Negussie Worku
(74) *Attorney, Agent, or Firm* — Fitzpatrick, Cella, Harper & Scinto

(57) ABSTRACT

A simple configuration is used to reduce an impact applied to a reading sensor when the open/close unit is opened/closed. A back face CIS unit is retained to be movable with regard to a pressure plate so that the back face CIS unit can have a corrected posture when the pressure plate is closed.

14 Claims, 26 Drawing Sheets

(56) References Cited

U.S. PATENT DOCUMENTS

| | | | |
|---|---|---|---|
| 8,210,515 B2* | 7/2012 | Nishizawa | B65H 5/26 |
| | | | 271/186 |
| 8,804,211 B2 | 8/2014 | Morinaga et al. | 358/497 |
| 8,840,103 B2* | 9/2014 | Fukumoto | B65H 3/06 |
| | | | 271/10.01 |
| 8,842,348 B2 | 9/2014 | Takeuchi | 358/498 |
| 8,934,148 B2 | 1/2015 | Tokuyama et al. | 358/474 |
| 8,964,266 B2* | 2/2015 | Yamasaki | H04N 1/1039 |
| | | | 358/474 |
| 2013/0194341 A1* | 8/2013 | Ishizuka | B41J 11/0095 |
| | | | 347/17 |
| 2013/0194600 A1* | 8/2013 | Kawanishi | H04N 1/00915 |
| | | | 358/1.13 |
| 2015/0055198 A1* | 2/2015 | Kawanishi | H04N 1/00819 |
| | | | 358/497 |
| 2015/0264214 A1 | 9/2015 | Kawanishi | H04N 1/02885 |

\* cited by examiner

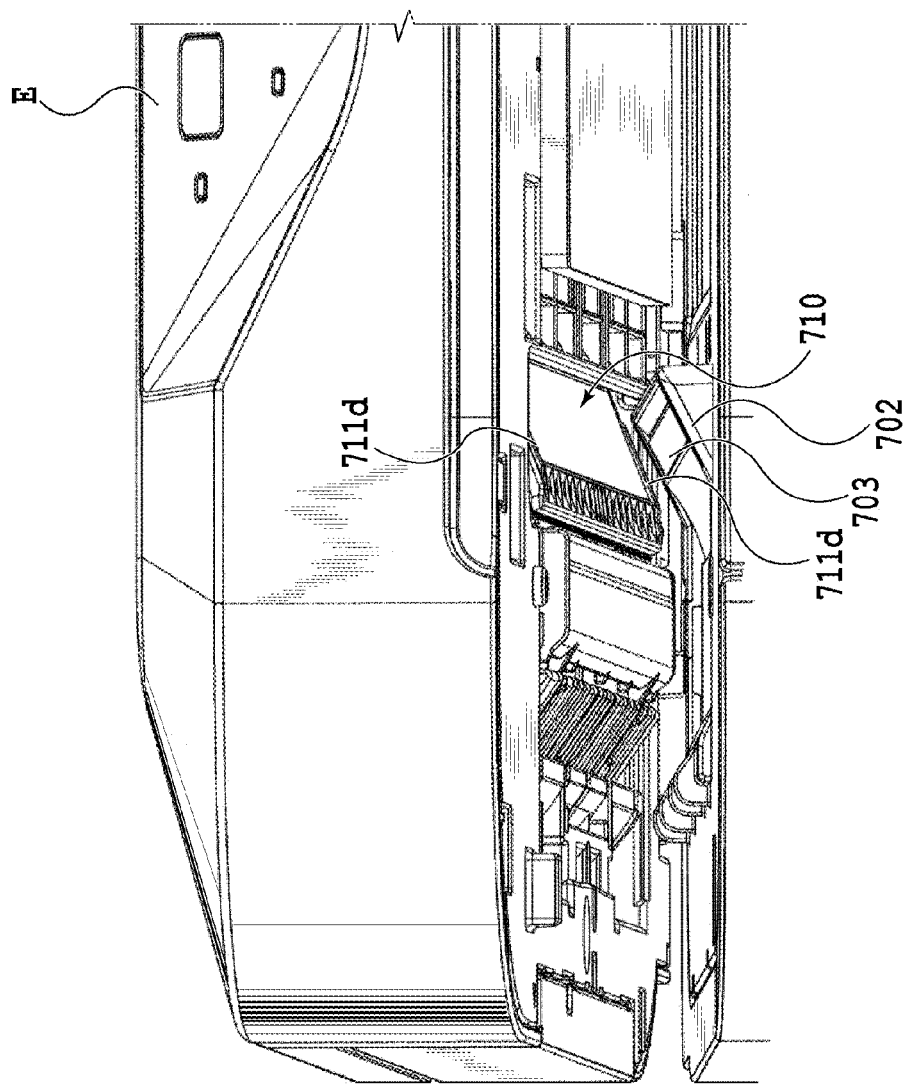

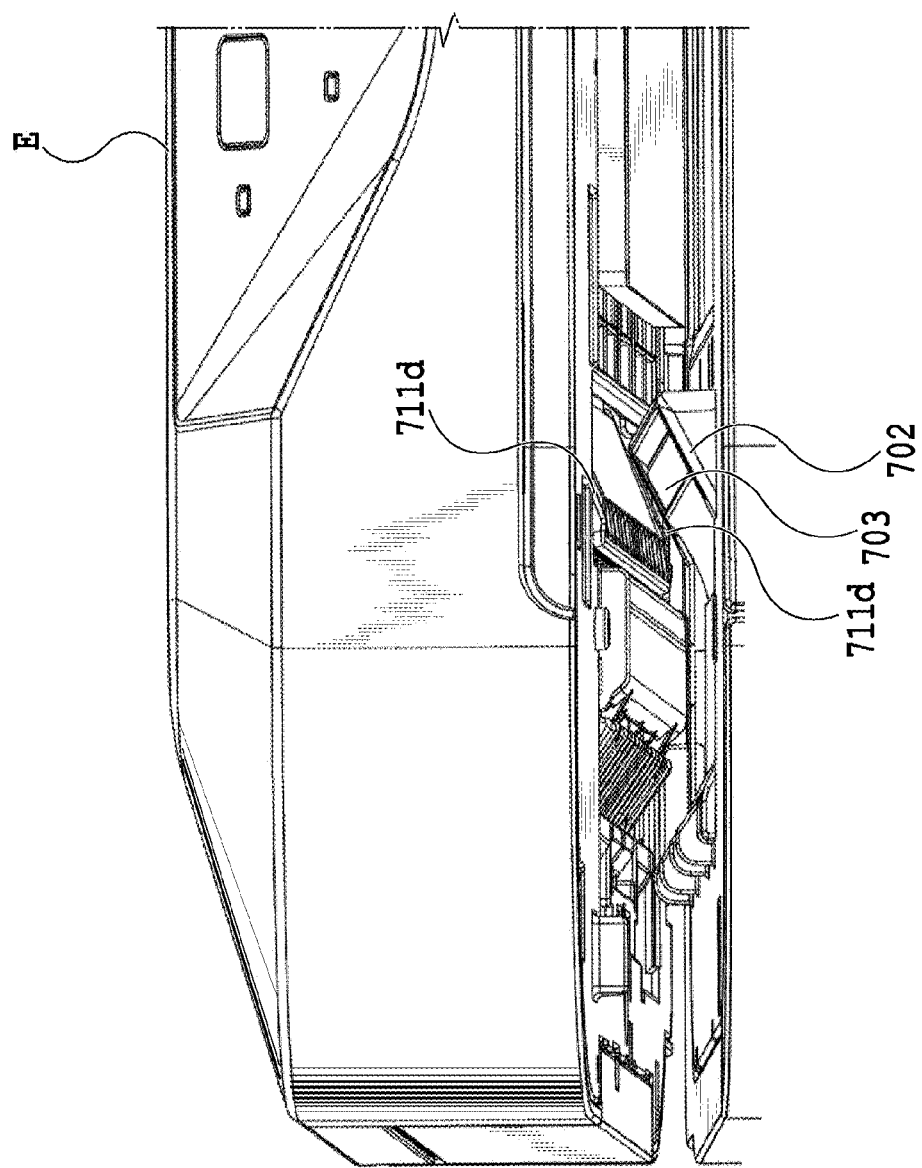

IMAGE READING APPARATUS

BACKGROUND OF THE INVENTION

Field of the Invention

The present invention relates to an image reading apparatus in which an openable and closable unit includes an image reading sensor.

Description of the Related Art

Japanese Patent Laid-Open No. 2011-211479 discloses a so-called one-pass double-side reading type image reading apparatus in which, in addition to a first reading sensor provided at a lower side of a glass platen, a second reading sensor is provided in a manuscript conveying unit so that a single transportation of a manuscript allows image information on the top face and the back face to be read. This image reading apparatus is configured, in order to accommodate the reading of a book-type manuscript, so that an open/close unit (cover unit) that is openable and closable to an apparatus body includes the manuscript conveying unit including the second reading sensor. When the open/close unit is opened/closed, the impact applied to the second reading sensor is reduced by retaining the second reading sensor in a box-like sensor retention unit and a bottom face of the second reading sensor and an interior bottom face of the sensor retention unit have therebetween an impact-absorbing member.

As disclosed in Japanese Patent Laid-Open No. 2011-211479, providing the box-like sensor retention unit and the impact-absorbing member in order to reduce the impact applied to the second reading sensor causes the open/close unit to have a larger size and the open/close unit having an increased weight, which causes a risk of an increased impact when the open/close unit is opened/closed. Furthermore, the configuration of Japanese Patent Laid-Open No. 2011-211479 to reduce the impact to the second reading sensor causes, when the impact-absorbing member deteriorates with age, the second reading sensor in the box-like sensor retention unit has a different posture, thus causing a risk of the defective reading (one-sided blurring) of the manuscript.

SUMMARY OF THE INVENTION

The present invention provides an image reading apparatus that can reduce, by a simple configuration, the impact applied to the reading sensor when the open/close unit is opened/closed.

In the first aspect of the present invention, there is provided an image reading apparatus, comprising:
an apparatus body, and
a unit, having a reading sensor, provided to be openable to the apparatus body,
wherein:
the reading sensor is retained by the unit in a rotatable manner so as to become, when the unit is closed, a predetermined posture along a reference plane provided with the apparatus body.

In the second aspect of the present invention, there is provided an image reading apparatus, comprising:
an apparatus body having a platen surface,
a unit, having a reading sensor, provided to be openable to the apparatus body,
a reference plane inclined with respect to the platen surface, the reading sensor being abutted to the reference plane when the unit is closed, and
a biasing portion configured to allow a biasing force to act to the reading sensor toward the reference plane, the biasing portion providing the biasing force so as to move the reading sensor toward a lower side of the inclination of the reference plane in the gravity direction.

According to the present invention, the impact applied to the reading sensor can be reduced by a simple configuration by retaining the reading sensor in a movable manner so that the posture of the reading sensor is corrected when the openable and closable unit is closed.

Further features of the present invention will become apparent from the following description of exemplary embodiments (with reference to the attached drawings).

BRIEF DESCRIPTION OF THE DRAWINGS

FIG. 17 illustrates the automatic paper feeding pressure plate in the middle of the closing operation;

FIG. 18 illustrates the automatic paper feeding pressure plate in the middle of the closing operation;

DESCRIPTION OF THE EMBODIMENTS

Figure 1:
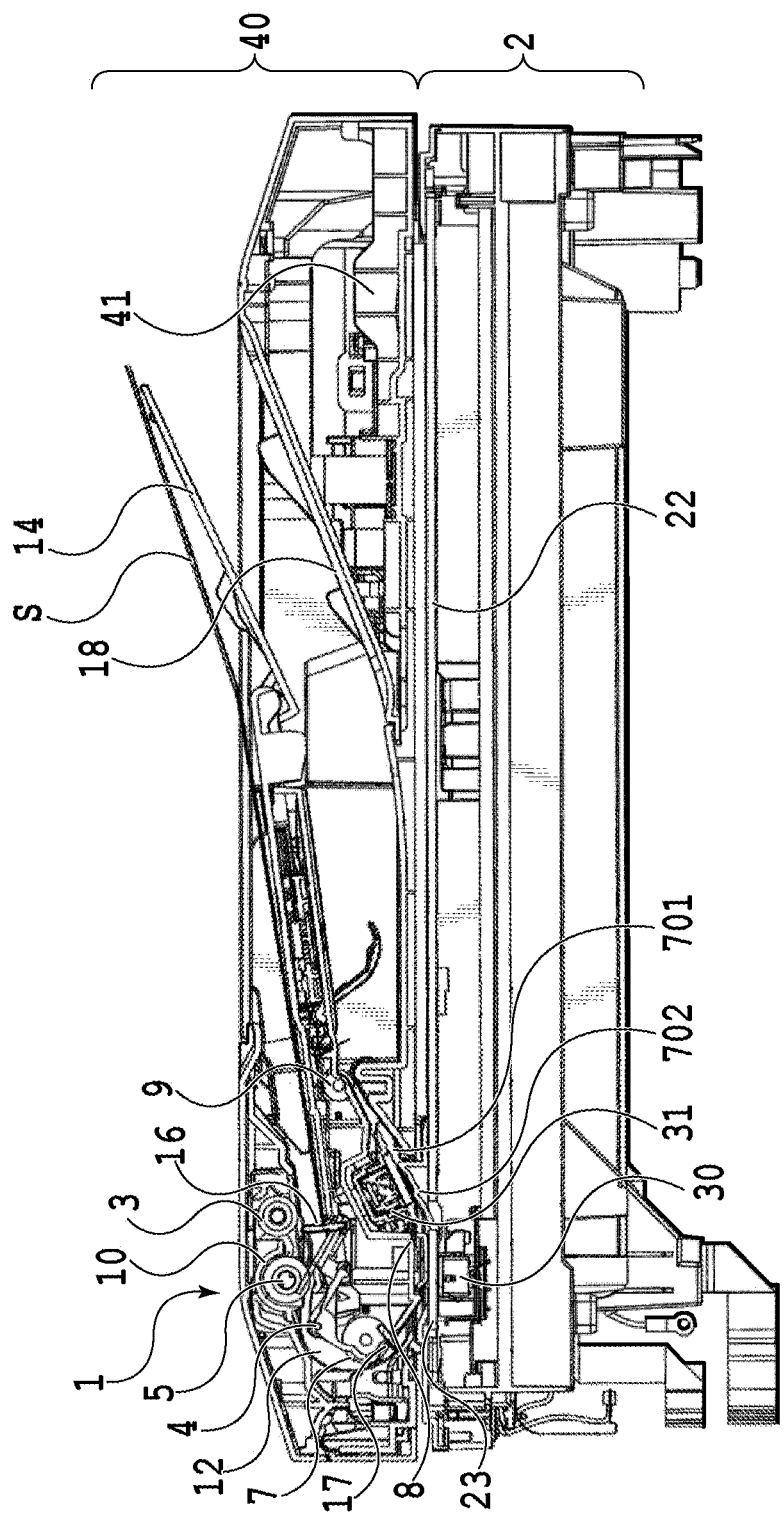
FIG. 1 is a cross-sectional view illustrating an inkjet printing apparatus including an image reading apparatus of the present invention.
Figure 2:
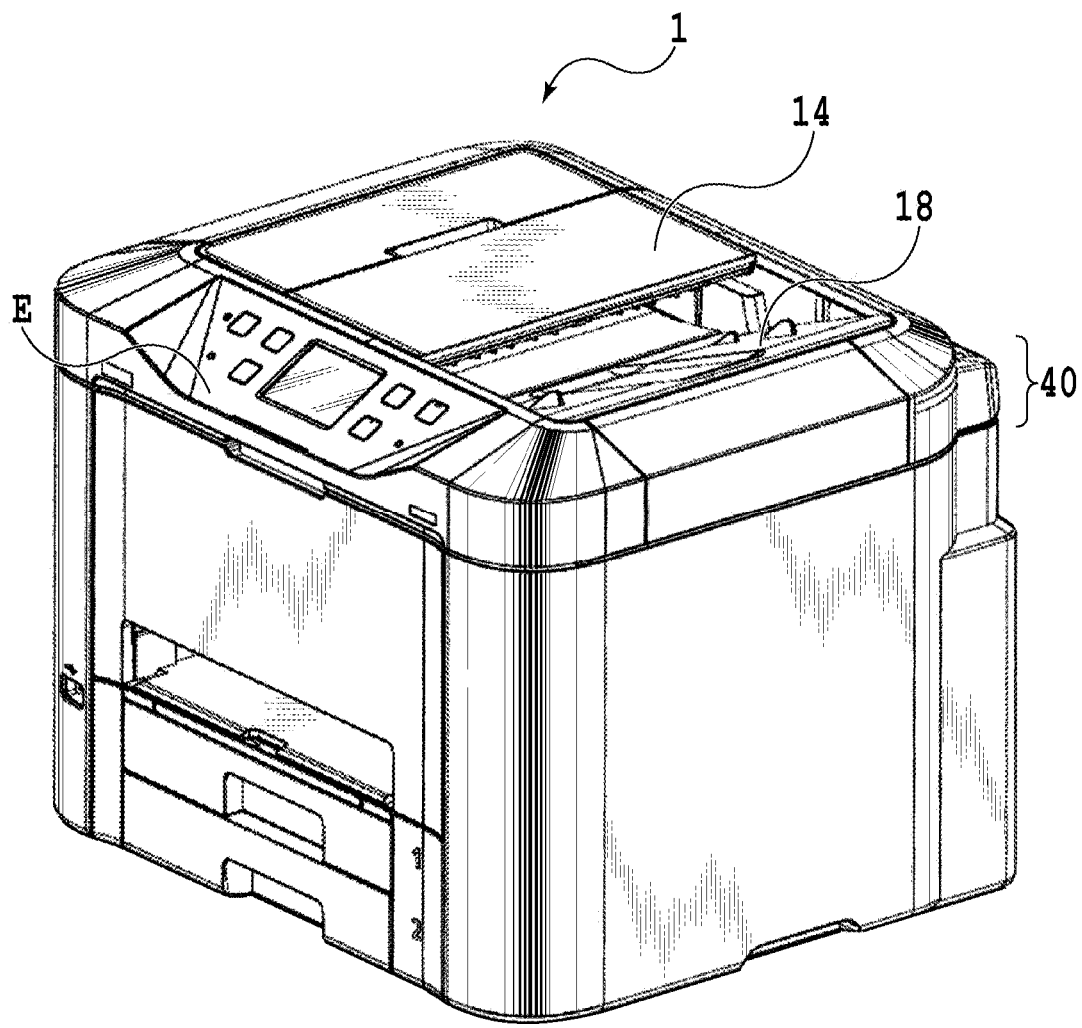
FIG. 2 is a perspective view illustrating the inkjet printing apparatus.

The following section will describe an embodiment for carrying out the present invention with reference to the drawings. An image reading apparatus may be provided in a body of an image printing apparatus (e.g., a copier, a printer, a facsimile, and the complex machine thereof) as a part of a configuration element of the image printing apparatus. In this case, reading information read by the image reading apparatus is printed on a printing medium such as a sheet by an image printing unit of the image printing apparatus. Specifically, the image read by the image reading apparatus is copied on the sheet by the image printing unit. Configuration components described in the following embodiment have a size, material, shape and a relative arrangement for example that should be appropriately changed depending on the configuration of the apparatus to which the present invention is applied or various conditions and do not limit the scope of the present invention.

In this embodiment, an automatic paper feeding reading apparatus will be described as an image reading apparatus including a manuscript feeding apparatus to which the present invention can be applied.

(Configuration and Operation of Manuscript Reading Conveying Unit)

First, the following section will describe the configuration and operation of a manuscript reading conveying unit 1 in an automatic paper feeding reading apparatus.

In FIG. 1 to FIG. 5, the manuscript reading conveying unit 1 includes a pressure plate 40 constituting an openable and closable unit. The automatic paper feeding pressure plate (hereinafter referred to as "pressure plate") includes therein a manuscript conveying path (U turn path) 12 for conveying a manuscript S in a predetermined direction. This U turn path 12 is attached with a manuscript existence/nonexistence sensor 16 that detects the existence/nonexistence of the manuscript S and a manuscript edge sensor 17 that detects a front end and a rear end of the manuscript S for example.

Figure 5:
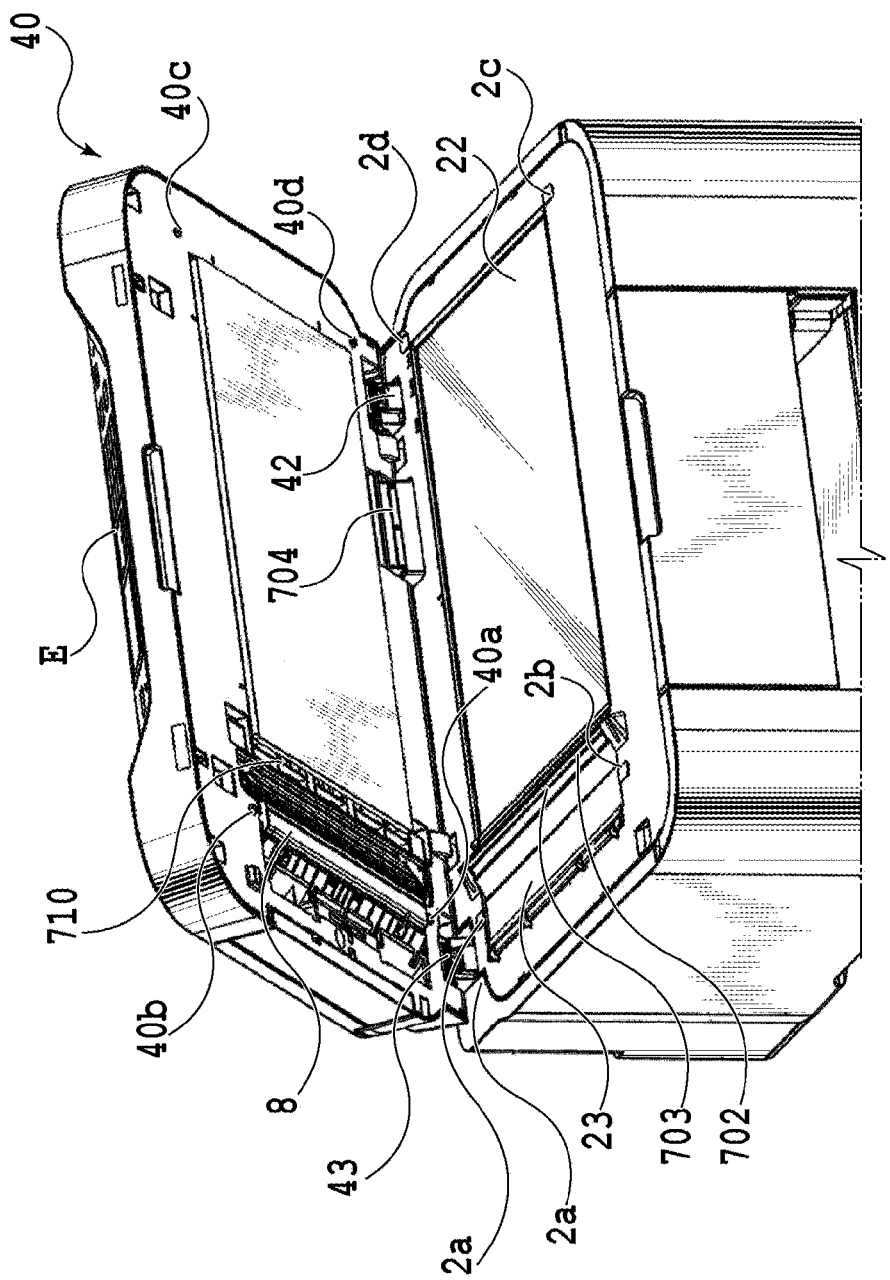
FIG. 5 is a perspective view illustrating the inkjet printing apparatus when the automatic paper feeding pressure plate is opened.

The manuscript reading conveying unit 1 includes a manuscript-receiving tray 14 positioned at the upstream end side of the conveying direction of the U turn path 12 and a manuscript discharge tray 18 positioned at the downstream end side of the conveying direction of the U turn path 12. The upstream end side of the U turn path 12 has a pickup roller 3 that is abutted to the manuscripts S positioned in the top layer of the manuscripts S to pick up the manuscript S. The manuscripts S picked up by the pickup roller 3 are divided to the respective sheets by a separation roller 5 and a separation pad 4 abutted to each other. At the middle of the U turn path 12, a first conveying roller 7 is provided and the downstream end side thereof has a second conveying roller 9 to discharge the manuscript S to the manuscript discharge tray 18. The pressure plate 40 is provided in an openable and closable manner as shown in FIG. 1 and FIG. 5 by hinges (hinge units) 42 and 43 provided at the rear side thereof. More specifically, the pressure plate 40 is supported so as to be rotatable in an open/close direction around the rotating axis line of the hinges 42 and 43.

The image information of the manuscript positioned on a reading glass 22 constituting a platen surface is read by a book manuscript reading unit 2. A long contact image sensor (hereinafter referred to as "CIS") 30, which functions as a reading sensor, is placed so as to be opposed to the manuscript reading conveying unit 1 via the glass 22. The CIS 30 is along line image sensor in which light is emitted from the LED provided therein to a printing face of the image information of the manuscript (image information face) and reflected light reflected from the image information face is used to form an image through a self-focusing rod lens array onto a sensor element, thereby reading the image information on the top face of the manuscript. This CIS (top face reading CIS) 30 is provided so as to be movable in the left-and-right direction in FIG. 1. When the book manuscript is being read (a flat-bed scanning), the CIS 30 reads the image information of the manuscript placed on the reading glass 22 while moving from the left side to the right side of the drawing.

When reading the image information of the manuscript S conveyed by the manuscript reading conveying unit 1, the CIS 30, which is stopped at a sheet manuscript reading position of FIG. 1 (a position opposed to a reading white plate 8), reads the image information on the top face of the manuscript S conveyed to the reading position thereof via an ADF (automatic sheet feeder) glass 23 constituting a platen surface (a plane of a manuscript stand). A CIS (back face reading CIS) 31 functioning as a reading sensor is configured to read the image information of a back face of the manuscript S and is fixed between the ADF glass 23 and the second conveying roller 9. The pressure plate 40 has convex portions 40a, 40b, 40c, and 40d (see FIG. 5) used for a height positioning when the pressure plate 40 is closed. The book manuscript reading unit 2 has seating faces 2a, 2b, 2c, and 2d corresponding to the convex portions 40a, 40b, 40c, and 40d. These seating faces are formed to be positioned on the same horizontal plane.

A driving motor M (see FIG. 4) of the manuscript reading conveying unit 1 is a brush-type DC motor whose motor axis has thereon a code wheel film M1. A rotary encoder M3 detects the rotation amount of the driving motor M by allowing a detection slit pattern printed on the code wheel film M1 to be read by an encoder sensor M2. Based on a pulse signal from the encoder M3, the pulse-width modulation (PWM) control method is used to control the rotation of the driving motor M. The driving force of the driving motor M is transmitted from the gear array M4 to the separation roller 5, the pickup roller 3, the first conveying roller 7, and the second conveying roller 9. As a result, all rollers used to read the image information of the manuscript S are rotated by the gear array M4 positioned at the rear face side of the apparatus. Thus, no gear array is positioned at the front face side or the apparatus.

When an operator instructs a reading operation to start through an operation unit E, then the driving motor M is rotated. In accordance with this, the separation roller 5 and the pickup roller 3 are rotated and a pickup arm 10 are lowered and the pickup roller 3 is depressed to the manuscript S. The rotation of the pickup roller 3 allows the manuscript S on the manuscript-receiving tray 14 to be sent into the U turn path 12. Then, the manuscript reading conveying unit 1 allows the separation roller 5 and the separation pad 4 to separate the manuscripts S one by one and the manuscript S in the top layer is separated and conveyed. The manuscript S separated in this manner is conveyed along the U turn path 12 and is conveyed by the first conveying roller 7 to the reading position of the CIS 30. The separation roller 5 is configured to rotate at a circumferential velocity lower than those of the first conveying roller 7 and the second conveying roller 9. By allowing the driving motor M to rotate continuously, the first manuscript S and the second manuscript S have therebetween a conveying interval of a predetermined amount.

The manuscript reading conveying unit 1 is configured, when the manuscript edge sensor (DES) 17 detects the front end of the manuscript S and the manuscript S is conveyed by a predetermined amount, to start the operation by the CIS 30 to read the image information on the top face while conveying the manuscript S. Then, after the rear end of the manuscript S is detected by the manuscript edge sensor 17, when the manuscript S is conveyed by the predetermined amount, then the reading of the image information by the CIS 30 is completed. When there is a subsequent manuscript S, the rotation of the driving motor M is continued to read the image information of the next manuscript S. Until the manuscript existence/nonexistence sensor 16 detects the nonexistence of the next manuscript S, the manuscripts S are continuously conveyed one by one to read the image information of these manuscripts S similarly. When the image information on both faces of the manuscript S are read, the CIS 31 is simultaneously operated to correct the displacement of the sensor position to read the image information on the back face.

Figure 3:
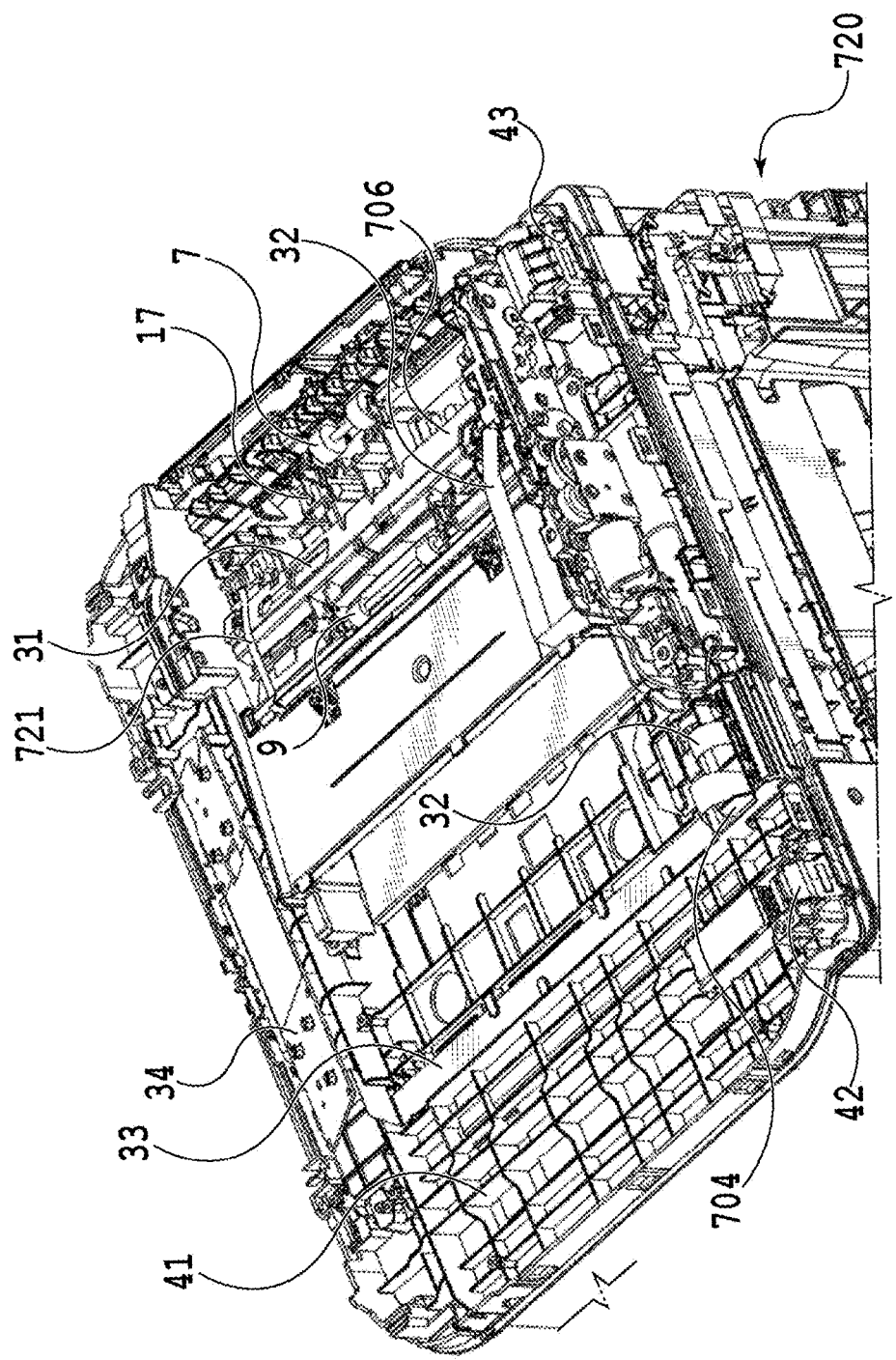
FIG. 3 illustrates an internal structure of an automatic paper feeding pressure plate of the inkjet printing apparatus.
Figure 4:
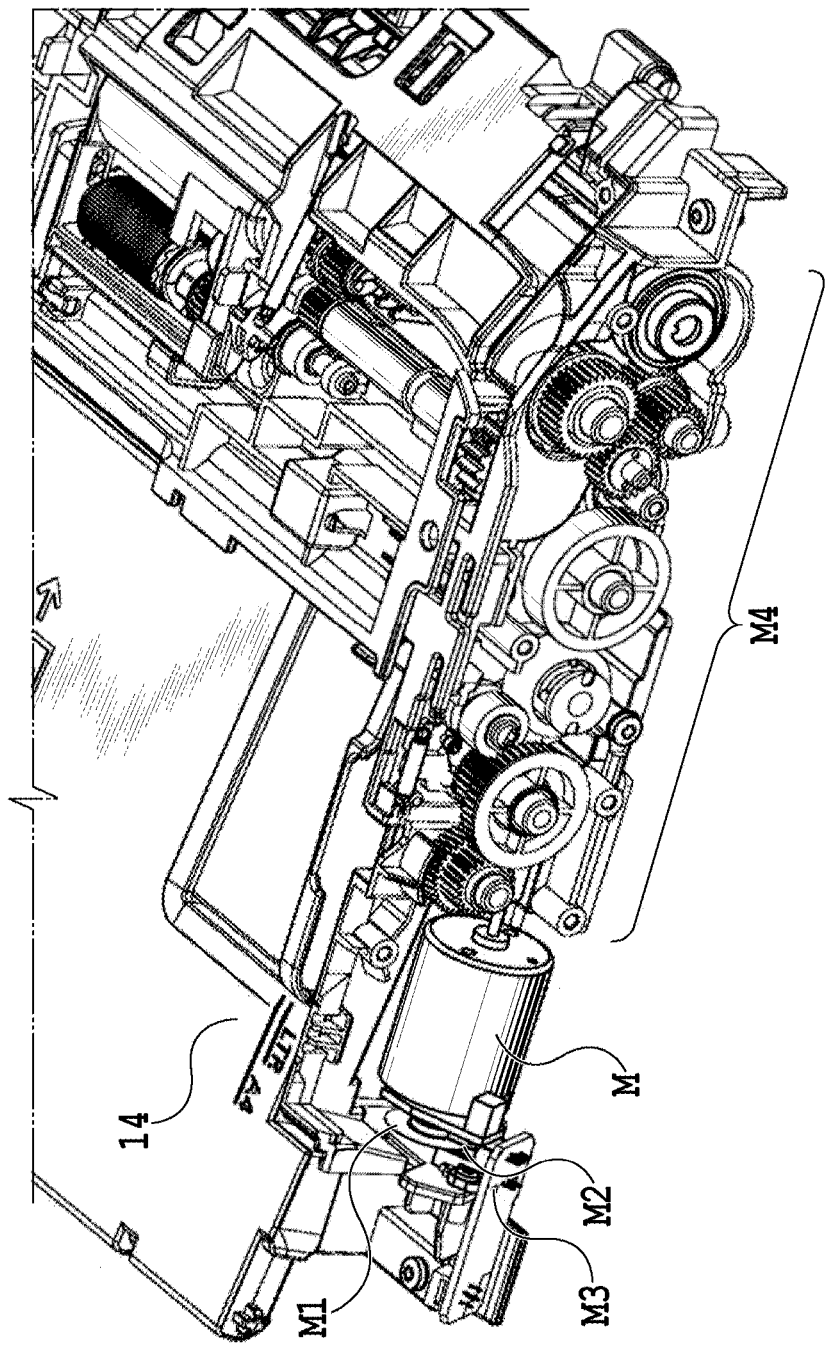
FIG. 4 illustrates a driving unit of the automatic paper feeding pressure plate in FIG. 1.

As shown in FIG. 3, a first flexible flat cable (hereinafter FFC) 32 connected to the CIS 31 is drawn to the downstream side of the conveying direction of the manuscript for which image information is read and to the rear side of the apparatus. The FFC 32 is guided by a cable guide 704 and is connected to a main control substrate 720 via the rear side of the apparatus. An operation unit control substrate 34 and the main control substrate 720 are connected by an FFC 33. The FFC 33 is drawn from the operation unit control substrate 34 to the rear side of the apparatus via the space between a base plate 41 of the pressure plate 40 and the manuscript discharge tray 18. As shown in FIG. 3, the FFC 33 is sent via the cable guide 704 and is downwardly bent at the rear side of the apparatus and is connected to the body of the apparatus. The configuration as described above allows the FFC 33 to be freely bent when the pressure plate 40 is rotated. The manuscript existence/nonexistence sensor 16, the manuscript edge sensor 17, and the operation unit control substrate 34 are connected by an FFC 721. Signals from the manuscript existence/nonexistence sensor 16 and the manuscript edge sensor 17 are sent via the operation unit control substrate 34 and the FFC 33 to the main control substrate 720.

In this example, the control substrate (not shown) of the CIS 31 includes an analog front end (hereinafter referred to as AFE) chip including therein an A/D converter. An analog image signal read by the CIS 31 is converted to a digital image signal and is subsequently outputted to the FFC 32. The CISs 31, 32, and 33 are separated from the driving motor M and the wiring thereof so that a contact therebetween is prevented. This can consequently reduce, when high electric power is used, the influence by radiation noise generated from the driving motor M as a noise source. The configuration as described above is particularly preferable for such an apparatus that uses a low-cost brush-type DC motor in which spark noise due to brush friction occurs.

(Configuration of Control Unit)

Figure 6:
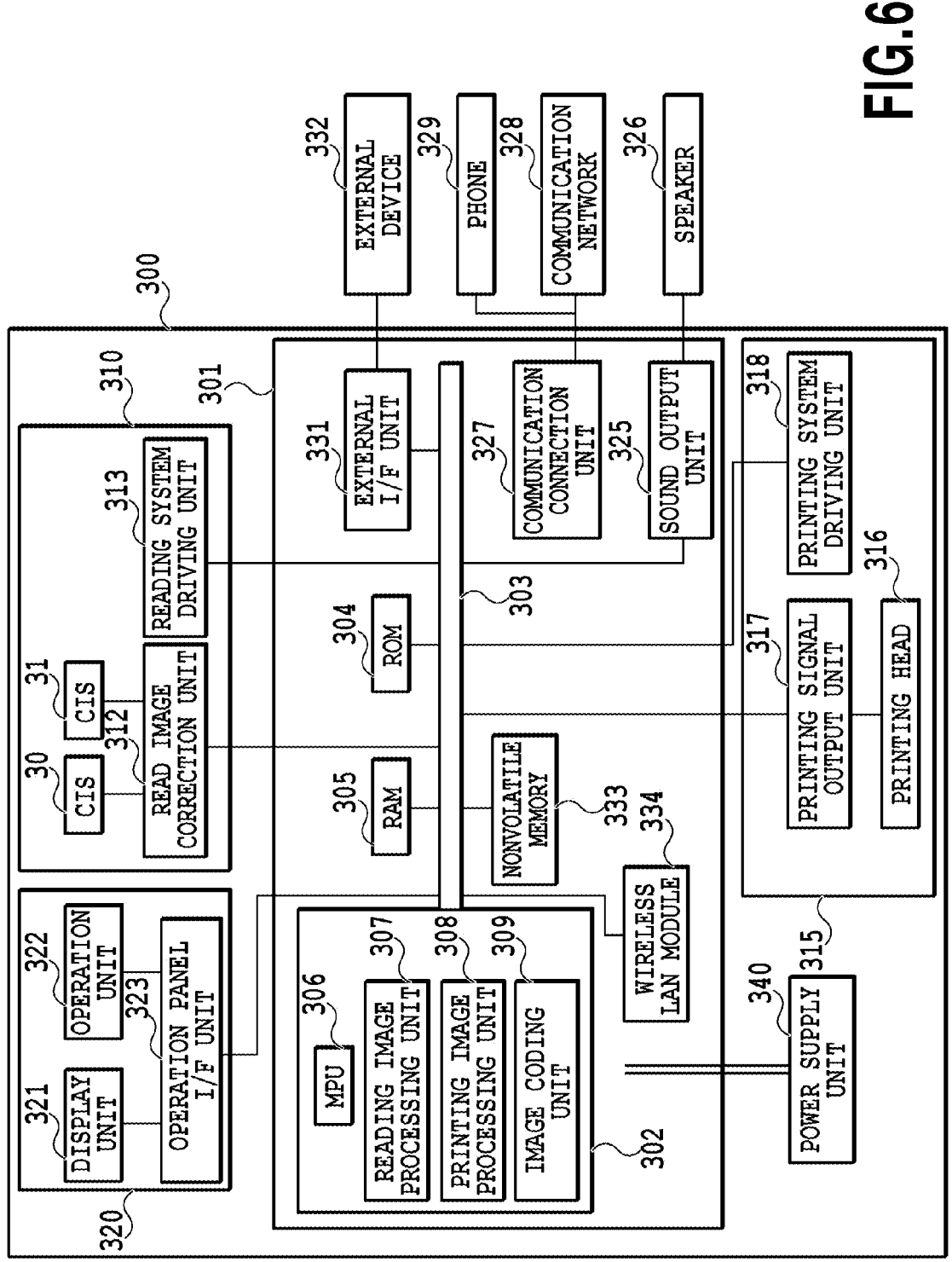
FIG. 6 is a block diagram illustrating a control system of the inkjet printing apparatus.

Next, with reference to the block diagram of FIG. 6, the following section will describe the configuration of a control unit 300 of the automatic paper feeding reading apparatus including the image printing apparatus.

A main control IC 302 included in a main control substrate 301 is composed, for example, of a microprocessor unit (MPU) 306, a reading image processing unit 307, a printing image processing unit 308, and an image coding unit 309 and controls the entire apparatus via a system bus 303. A ROM 304 stores therein program codes, initial value data, and table data for example for the operation of the MPU 306. A RAM 305 is used for a calculation buffer and an image memory for example. A reading unit 310 is composed of the CISs 30 and 31, a read image correction unit 312, and a reading system driving unit 313 for example.

In the reading unit 310, the reading system driving unit 313 is driven to move the CIS 30 and the CIS 30 is used to optically read image information sequentially to thereby convert the image information to an electrical image signal. This signal is subjected by the read image correction unit 312 to a processing such as shading correction. Furthermore, the reading image processing unit 307 performs an image processing to output high-resolution image data. When the image information on both faces of the manuscript S is read, the CIS 31 and the CIS 30 are operated simultaneously.

An inkjet-type printing unit 315 drives a printing system driving unit 318 to move a printing head 316 to a predetermined position and outputs the image data prepared in the printing image processing unit 308 via a printing signal output unit 317 to the printing head 316, thereby printing an image. An operation panel 320 outputs the image via an operation panel interface unit 323 to a display unit 321 and receives an operation input from an operation unit 322. A sound output unit 325 converts sound data to a signal and the signal is outputted a message sound through a speaker 326. A communication connection unit 327 is connected to a communication network 328 and a phone 329 and inputs or outputs sound or coding data. The coding data is converted by the image coding unit 309 to an image. An external interface unit 331 such as a USB standard is connected to an external device 332 such as a personal computer. A nonvolatile memory 333 composed of a flash memory for example stores, during electric power failure for example, work data or image data so as to prevent the data from being deleted. A wireless LAN module 334 inputs or outputs an image via an access point exterior to the apparatus. A power supply unit 340 supplies electric power required for the operation of the main control substrate 301, the reading unit 310, the printing unit 315, and the operation panel 320 for example.

The following section will describe a PC scan operation, a copy operation, a facsimile reception operation, and a printing operation of the automatic paper feeding reading apparatus including the image printing apparatus.

(PC Scanning Operation)

The image information of the manuscript S read by the CISs 30 and 31 of the reading unit 310 is firstly subjected by the read image correction unit 312 to a processing such as a shading correction and is subsequently developed as image data into the RAM 305 by the reading image processing unit 307. The image data is compressed based on a JPEG format for example by the image coding unit 309. The coded data is outputted via the external interface unit 331 to the external device 332.

(Copying Operation)

The image information of the manuscript read by the CISs 30 and 310 of the reading unit 310 is subjected by the read image correction unit 312 to a processing such as a shading correction and is subsequently developed as image data into the RAM 305 by the reading image processing unit 307. The image data is subjected to a compression coding by the image coding unit 309 based on a JPEG format for example and is accumulated once. The accumulated image data is sequentially sent to the printing image processing unit 308 and is converted to to-be-printed image data. The to-be-printed image data is outputted to the printing head 316 via the printing signal output unit 317 to allow, based on the to-be-printed image data, an image to be printed on a printing medium such as a printing paper.

(Facsimile Transmission Operation)

The image information of the manuscript read by the CISs 30 and 31 of the reading unit 310 is subjected by the read image correction unit 312 to a processing such as a shading correction and is subsequently developed as image data by the reading image processing unit 307 into the RAM 305. The image data is subjected by the image coding unit 309 to a compression coding based on the MR (modified read) format and is subsequently accumulated once. The transmission of the accumulated image data is started after a facsimile communication procedure signal is transmitted/received by the communication connection unit 327. Even after the start of the transmission, the image information of the manuscript is continuously read and the transmission is continued while accumulating the image data.

(Facsimile Reception Operation)

When data is received from the communication network 328, the communication connection unit 327 transmits/receives a facsimile communication procedure signal and then the reception of the image data is started. The image data is demodulated by the image coding unit 309 and is developed into the RAM 305. The developed image data is sequentially sent to the printing image processing unit 308 and is converted to to-be-printed image data. By allowing the to-be-printed image data to be outputted to the printing head 316 via the printing signal output unit 317, an image is printed on a printing medium.

(Printing Operation)

Command and reception parameter are sent from the external device 332 and are received by the external interface unit 331. Such command and reception parameter are interpreted by the MPU 306 and are subsequently developed as image data by the image coding unit 309. The developed image data is sequentially sent to the printing image processing unit 308 and is converted to to-be-printed image data. By allowing the to-be-printed image data to be outputted to the printing head 316 via the printing signal output unit 317, an image is printed on a printing medium.

Next, the following section will describe the CIS 31 that reads the image information on the back face of the manuscript.

(CIS for Reading Back Face)

In FIG. 1, the CIS 31 for reading the back face is positioned at the downstream in the conveying direction of the manuscript than the CIS 30 for reading the image information on the top face of the manuscript. The CIS 31 is provided between the CIS 30 and the second conveying roller 9 that discharges the manuscript into the discharge tray 18. The CIS 30 also functions as a reading unit of the book manuscript reading unit 2. The ADF glass 23 constituting a manuscript reading plane during an ADF conveyance and the reading glass 22 of the book manuscript reading unit 2 are provided on substantially the same plane. On the other hand, the discharge tray 18 is provided in the pressure plate 40 and is provided substantially at the upper side of the reading glass 22 of the book manuscript reading unit 2. In order to allow the discharge tray 18 to accommodate accumulated manuscripts within a predetermined height, the second conveying roller 9 as a discharge roller is provided at the upper side of a predetermined height from the plane of the discharge tray 18 on which discharged papers are accumulated. A conveying path 701 is inclined with regard to the range from the ADF glass 23 to the second conveying roller 9 in order to scoop manuscripts. The CIS 31 is provided so as to be opposed to the conveying path 701.

The manuscript that is sent through the ADF glass 23 and that has top face-side image information read by the CIS 30 is scooped by the conveying path 701 from the glass surface of the ADF glass 23 and is sent through the conveying path 701, thereby allowing the back face-side image information to be read by the CIS 31. A guide unit 702 of the conveying path 701 opposed to the CIS 31 is configured to be substantially parallel to a glass 705 of the CIS 31 (see FIG. 8) (i.e., substantially parallel to the platen surface). The conveying path 701 is formed in a straight manner toward the second conveying roller 9. In this example, the conveying path 701 is inclined at an angle of about 25 degrees. This inclination angle is optimized by setting the discharge paper accommodation capacity of 50 sheets and by providing the reading unit (back face reading unit) for reading the back face-side image information between the top face-side image information reading unit (top face reading unit) and the discharged paper roller (the second conveying roller 9). The angle at which manuscripts are scooped by the conveying path 1701 is preferably 25 degrees±5 degrees. If this scoop angle is smaller than 20 degrees, the length of the discharged paper path must be increased in order to secure the height within which discharged papers are accumulated, which may consequently cause the apparatus having a larger size. If this scoop angle is larger than 30 degrees, the scoop angle is steep and thus a thick manuscript cannot be bent, which may cause a risk of a defective conveyance and a defective image reading. The guide unit 702 has a white reference sheet 703 that is provided along a region corresponding to the manuscript width and that functions as a white reference when the CIS 31 reads the image information on the back face of the manuscript.

(Configuration of Back Face CIS Unit)

Figure 7:
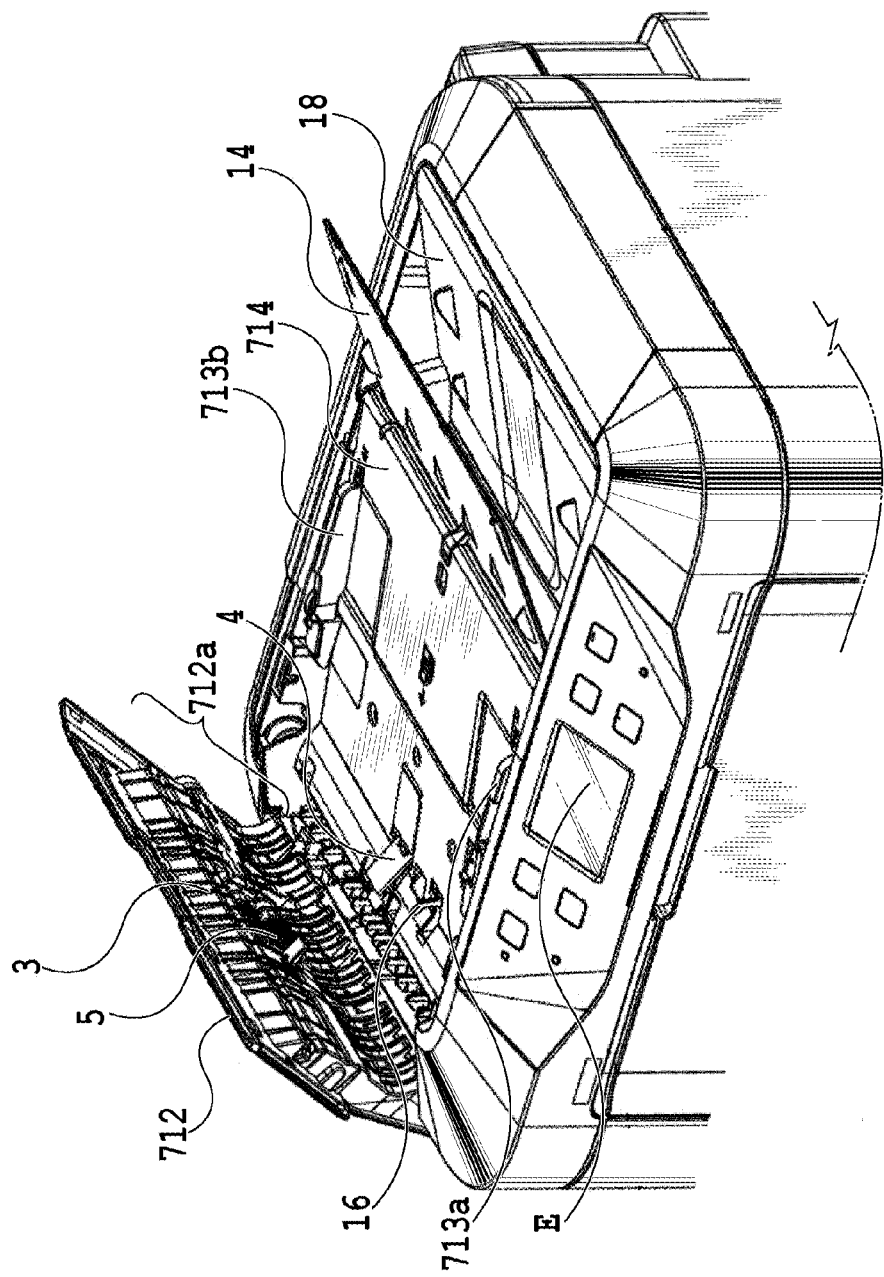
FIG. 7 is a perspective view illustrating a conveying path opened in the automatic paper feeding pressure plate.
Figure 8:
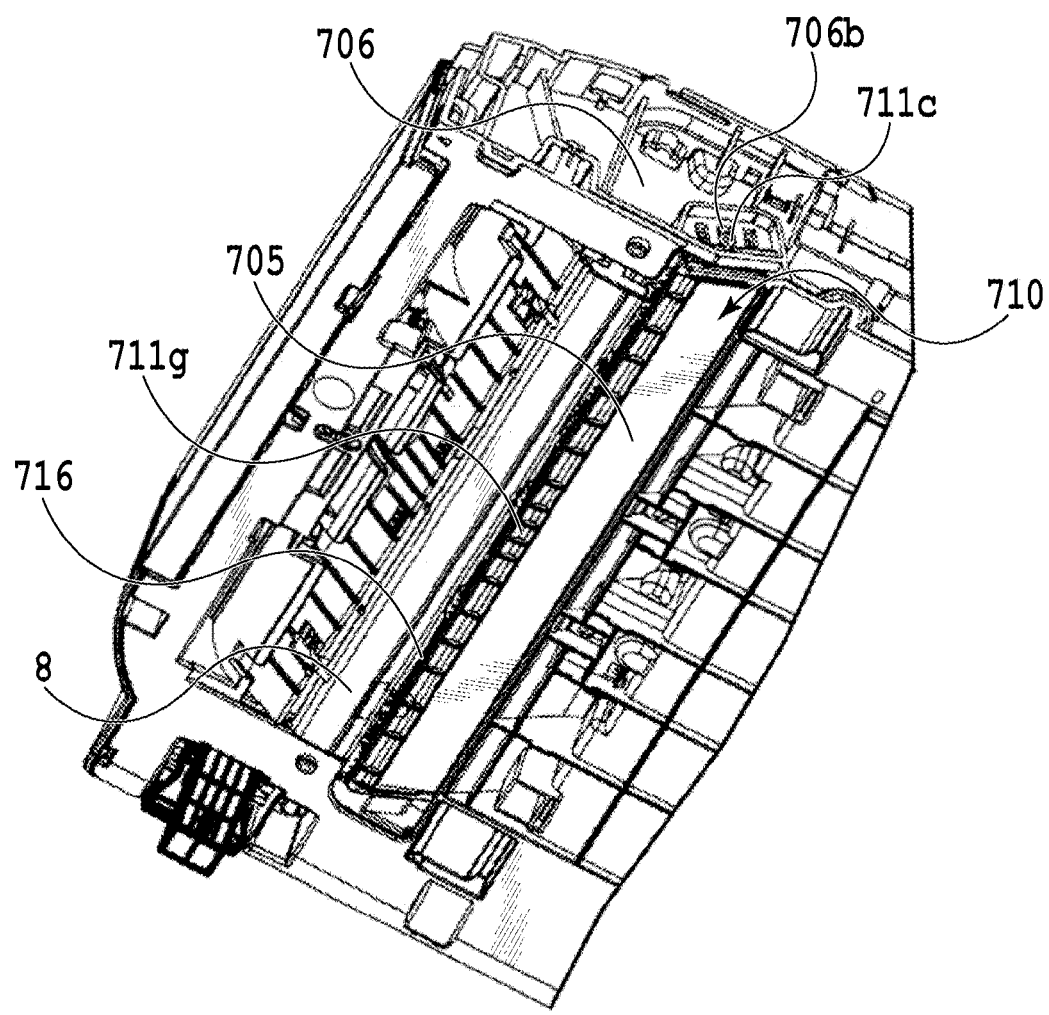
FIG. 8 is a perspective view illustrating the main part of the automatic paper feeding pressure plate.
Figure 9:
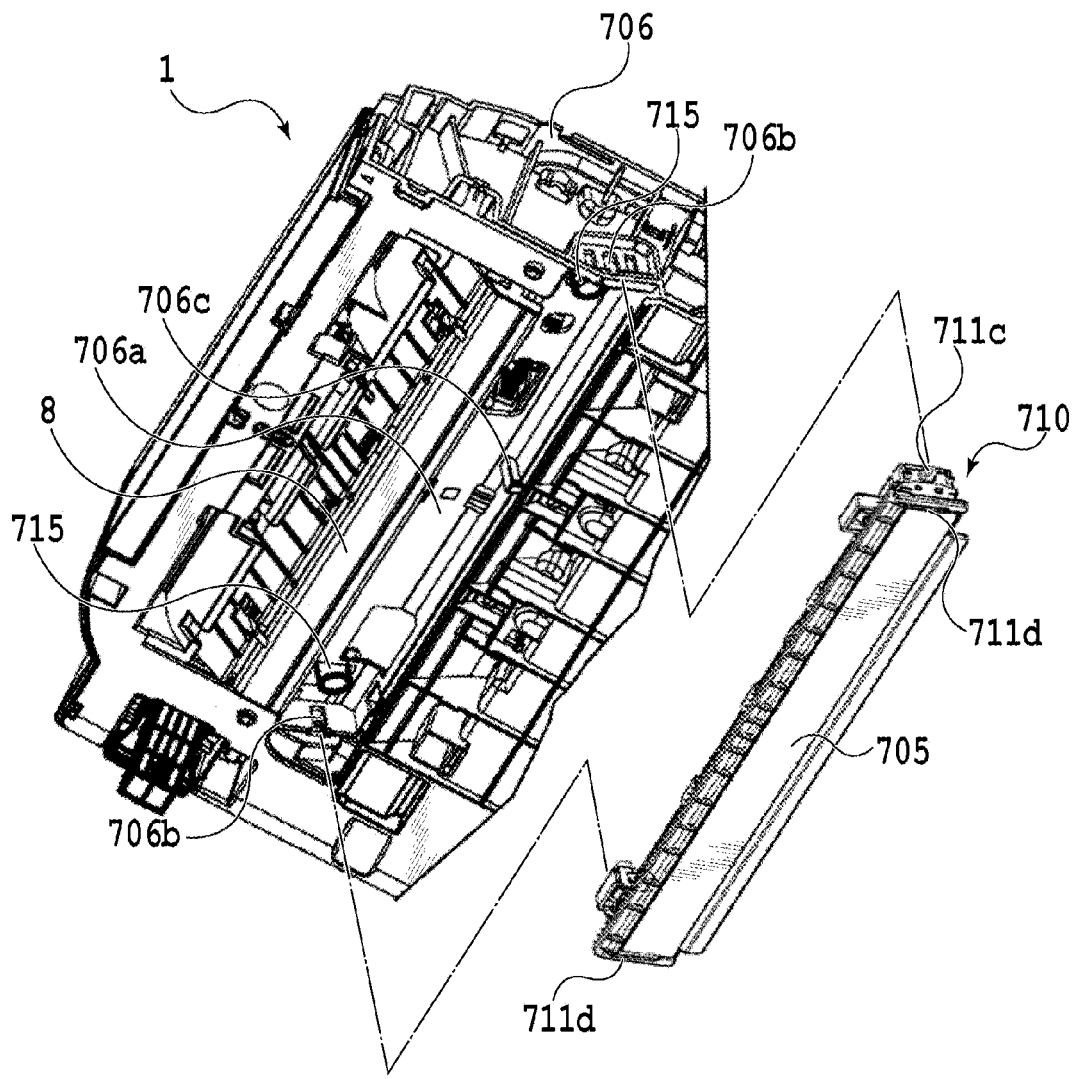
FIG. 9 is an exploded perspective view illustrating the automatic paper feeding pressure plate.
Figure 10:
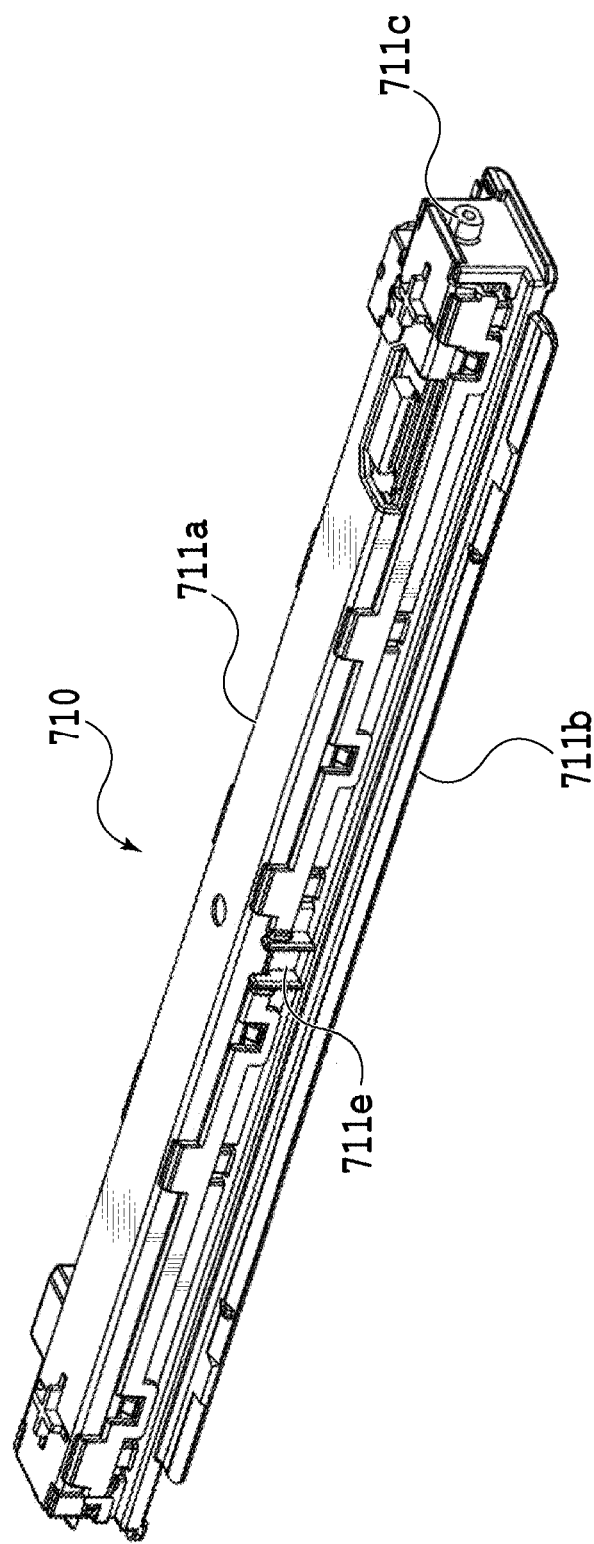
FIG. 10 is a perspective view illustrating a back face CIS unit in FIG. 9.
Figure 11:
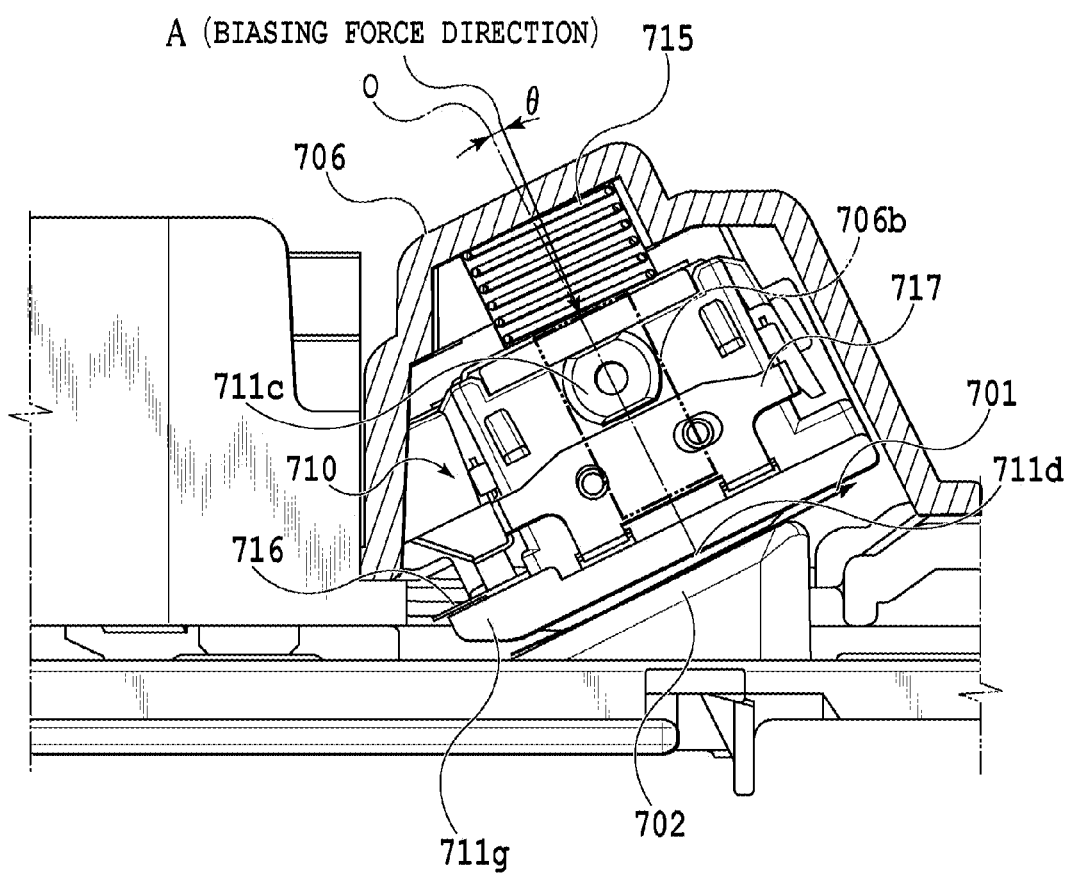
FIG. 11 is cross-sectional view illustrating a retention mechanism of the back face CIS unit.

Next, the following section will describe a structure to attach the back face reading CIS 31. FIG. 7 is a perspective view illustrating an ADF (auto sheet feeder) path to feed manuscripts, in FIG. 7 the ADF path is opened. FIG. 8 to FIG. 10 are perspective views illustrating a back face CIS unit 710 for retaining the back face reading CIS 31. FIG. 11 is a cross-sectional view of the back face CIS unit 710.

The back face CIS unit 710 retains the back face reading CIS 31 to configure a back face reading unit and the periphery thereof is surrounded by an upper case 711a and a lower case 711b (see FIG. 10) sandwiching the CIS 31. The lower case 711b is opposed to an image reading plane of the CIS 31. An opening formed at a position corresponding to such a reading plane is attached with the glass 705. The back face-side image information of the manuscript conveyed by the conveying unit is read via this glass 705. The CIS 31 is positioned and retained by the lower case 711b. A distance from the plane of the glass 705 to the reading sensor substrate of the CIS 31 is set accurately. The upper case 711a is positioned and retained with regard to the lower case 711b. The upper case 711a and the lower case 711b are formed by non-conductive material (Ps (polystyrene) in this embodiment). As a result, the back face CIS unit 710 has a box-like structure blocked by the cases 711, 711b, and glass 705. The box-like structure protects the CIS 31 from peripheral electrical noise and static electricity.

A main frame 706 functioning as a frame structure supports an ADF manuscript conveying unit and a driving unit. The main frame 706 supports the first conveying roller 7, the second conveying roller 9, the back face CIS unit 710, and the manuscript edge sensor 17. This consequently provides an accurate setting of the distance between these rollers and the distance from these rollers and the edge sensor 17 to the back face CIS unit 710. Furthermore, by providing them on the main frame 706 constituting the same frame member, the geometric accuracy thereof (e.g., the parallelism between the first and second conveying rollers 7 and 9 and the back face CIS unit 710) is maintained at a high level.

An ADF cover unit 712 is configured to be openable and closable in the manuscript reading conveying unit 1. In the open status as shown in FIG. 7, path for conveying the manuscript is exposed to allow an operator to access a jammed manuscript in the conveying path. The ADF cover unit 712 retains the separation roller 5 and the pickup roller 3 and has a manuscript conveying guide unit 712a having a rib-like shape. By opening the ADF cover unit 712, the conveying path is opened and the status at which the separation pad 4 is abutted to the separation roller 5 is cancelled. This allows the operator to easily remove a jammed manuscript in the conveying path.

The manuscript is placed on the manuscript placement unit. Side guides 713a and 713b provided on the manuscript receiving unit 714 guide both sides of the manuscript in the width direction (the front side and the rear side of the apparatus in this example). The manuscript receiving unit 714 has the above-described separation pad 4 and the manuscript existence/nonexistence sensor 16 and the manuscript tray 14 is axially supported in an openable and closable manner. The manuscript receiving unit 714 is positioned fixedly with regard to the main frame 706 to minimize the number of components existing therebetween. This provides an accurate setting of an angle in the direction along which the manuscript is guided by the side guides 713a and 713b with regard to the conveying roller and the back face reading unit.

The back face CIS unit 710 is supported by the main frame 706 so as to be movable in a direction orthogonal to the guide unit 702. The following section will describe a configuration to retain the back face CIS unit 710.
(Configuration to Retain Back Face CIS Unit)

In order to accommodate the back face CIS unit 710, the main frame 706 has a concave portion 706a having an opened portion at the lower side as shown in FIG. 9. The concave portion 706a is configured so that side wall faces opposed to each other in the longer side direction have long hole portion (concave portions) 706b, respectively. The long hole portions 706b are configured so that the long hole portions 706b extend in a longer side direction orthogonal to the guide unit 702, respectively. On the other hand, both ends in the longer side direction of the lower case 711b of the back face CIS unit 710 have axial projection portions (convex portions) 711c protruding in the longer side direction. The long hole portions 706b and the axial projection portions 711c are configured so that the former and the latter as well as the size in a shorter side direction orthogonal to the longer side direction of the long hole portions 706b and the diameter size of the axial projection portions 711c are fitted to have a slight gap thereamong. As described above, the opposing sections of the main frame 706 and the back face CIS unit 710 have the long hole portion 706b and the projection portion 711c fitted to each other. As shown in FIG. 8, when the back face CIS unit 710 is accommodated in the concave portion 706a of the main frame 706, with regard to the shorter side direction of the long hole portion 706b, the axial protrusion 711c and the long hole portion 706b are fitted each other to regulate the position of the axial protrusion 711c. On the other hand, with regard to the longer side direction of the long hole portion 706b, the axial protrusion 711c is movable (i.e., movable in a direction orthogonal to the guide unit 702).

A wall in the longer side direction of the concave portion 706a of the main frame 706 has, as shown in FIG. 9, a convex shape portion (convex portion) 706c extending in a direction orthogonal to the guide unit 702. At substantially the center of the back face CIS unit 710 and the downstream side in the conveying direction, a concave shape portion (concave portion) 711e is provided that extends in a direction orthogonal to the guide unit 702 as in the convex shape portion 706c. When this concave shape portion 711e is fitted to the convex shape portion 706c, the concave shape portion 711e positions the back face CIS unit 710 in the longer side direction of the line image sensor.

The lower case 711b of the back face CIS unit 710 has, at a position in the longer side direction exterior to a region in which the manuscript is conveyed, a protrusion 711d that is used to position the back face CIS unit 710 in the upper-and-lower direction (a direction orthogonal to the guide unit 702). When the axial protrusion 711c of the back face CIS unit 710 is guided into the long hole portion 706b and the back face CIS unit 710 is positioned at the lower side, the protrusion 711d is abutted to the guide unit 702 as shown in FIG. 11. As a result, the back face CIS unit 710 is positioned to have a predetermined interval to the guide unit 702. The back face CIS unit 710 and the main frame 706 have therebetween a spring (biasing portion) 715 as shown in FIG. 11. The spring 715 is configured so that one end is abutted to the upper case 711a and the other end is abutted to the main frame 706 to thereby bias the back face CIS unit 710 toward the guide unit 702. This consequently allows the protrusion 711d of the back face CIS unit 710 to be securely abutted to the guide unit 702, thereby positioning the back face CIS unit 710.

A direction along which a biasing force is applied from the spring 715 is set to have a predetermined angle to the longer side direction of the long hole portion 706b. Specifically, the direction A along which the biasing force is applied from the spring 715 is a direction as shown in FIG. 9 that is slightly displaced by the angle θ to the upper side in the drawing from the axis line O extending along a direction along which the back face CIS unit 710 can be moved (a direction orthogonal to the guide unit 702). This consequently generates a biasing force to move the axial protrusion 711c toward one side of the long hole portion 706b in the shorter side direction. The long hole portion 706b and the axial projection portion 711c allow the back face CIS unit 710 to be smoothly movable in a direction orthogonal to the guide unit 702 by being fitted to each other while having a predetermined gap (backlash) therebetween. However, the biasing force of the spring 715 causes the back face CIS unit 710 to be moved to the one side in the shorter side direction of long hole portion 706b (a direction to the lower side in the gravity direction of the inclined face or the left side in FIG. 11), thus suppressing the backlash between the long hole portion 706b and the axial projection portion 711c. This can consequently always regulate the position of the back face CIS unit 710 in the conveying direction of the manuscript to a predetermined position with regard to the main frame 706 to accurately set the distance between the back face CIS unit 710 and the manuscript edge sensor 17 in the manuscript conveying direction. In the case of this example, the direction A of the biasing force of the spring 715 is inclined from the axis line O along a direction orthogonal to the guide unit 702 by the angle θ of about 3 degrees. In addition, the conveying path 701 is inclined and the deadweight of the back face CIS unit 710 also causes the back face CIS unit 710 to be moved to the one side of the long hole portion 706b. As described above, the force from the spring 715 to the one side and the force from the deadweight of the sensor itself function to act on the same direction of the inclined face (a direction including the lower side of the gravity direction). Specifically, these two forces can be used for the movement to the one side, thus effectively suppressing the backlash of the back face CIS unit 710.

The back face CIS unit 710 is supported by the manuscript reading conveying unit 1 provided on the pressure plate 40. Thus, whenever the manuscript is set on during the book manuscript reading (flat head scanning), the pressure plate 40 is opened/closed and the abutment of the pressure plate 40 to the conveying guide 702 is cancelled and resumed repeatedly. Thus, it is important that, regardless of how many times the pressure plate 40 is opened/closed, the back face CIS unit 710 must have a position accuracy securely. In this example, the back face CIS unit 710 can be positioned as described above to thereby maintain the position accuracy securely.

In this example, the long hole 706b is provided at the main frame 706 side and the axis portion 711c fitted to the long hole 706b is provided at the back face CIS unit 710 side. On the contrary, the axis portion 711c also may be provided at the former side and the long hole 706b may be provided at the latter side. The spring 715 is not limited to a coil spring as in this example and also may be a plate spring to provide a similar effect. The spring 715 using a sponge-like member having elasticity such as urethane foam may provide a similar effect.

Another Example of the Retention Mechanism of the Back Face CIS Unit

Next, with reference to FIG. 12 to FIG. 14C, the following section will describe another example of the retention mechanism of the back face CIS unit 710 for the purpose of maintaining the positioning accuracy of the back face CIS unit 710. In these drawings, the same parts as in the above examples are denoted with the same reference numerals and will not be described further.

Figure 12:
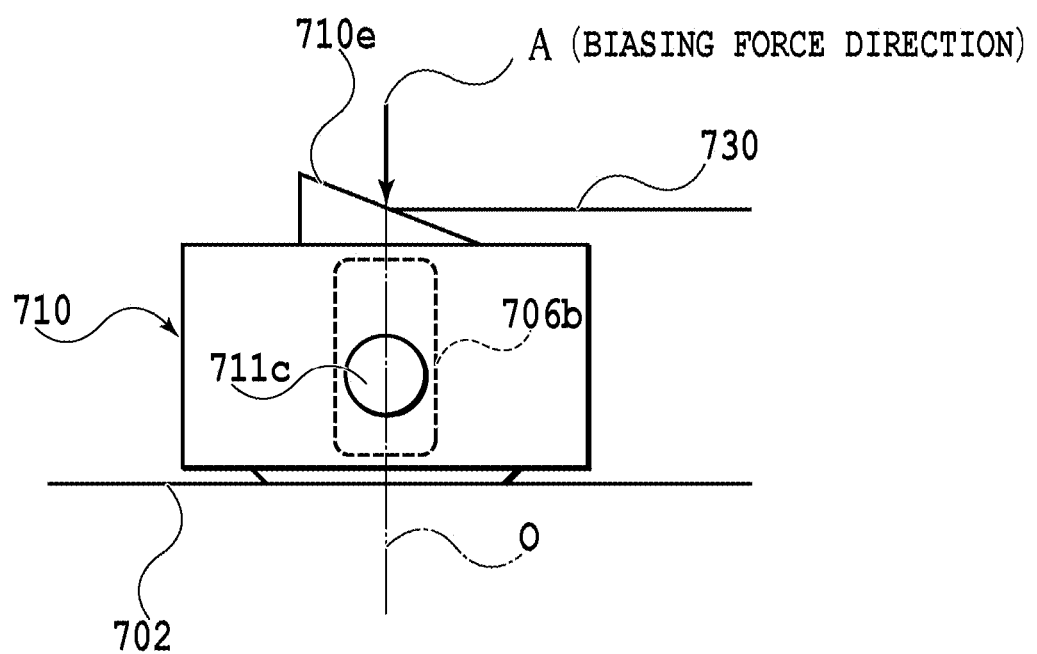
FIG. 12 illustrates another example of the retention mechanism of the back face CIS unit.

In the example of FIG. 12, a plate spring 730 is used as the spring 715. The direction along axis line O in which the back face CIS unit 710 is moved (the direction orthogonal to the guide unit 702) is in the same direction as the direction A in which the plate spring 730 is biased. However, the seating face 710e of the back face CIS unit 710 receiving the biasing force of the plate spring 730 is inclined to a plane orthogonal to the axis line O. Thus, the biasing force from the plate spring 730 causes a component force that moves the back face CIS unit 710 to the one side of the long hole portion 706b, which can suppress the backlash between the long hole portion 706b and the axial projection portion 711c.

Figure 13:
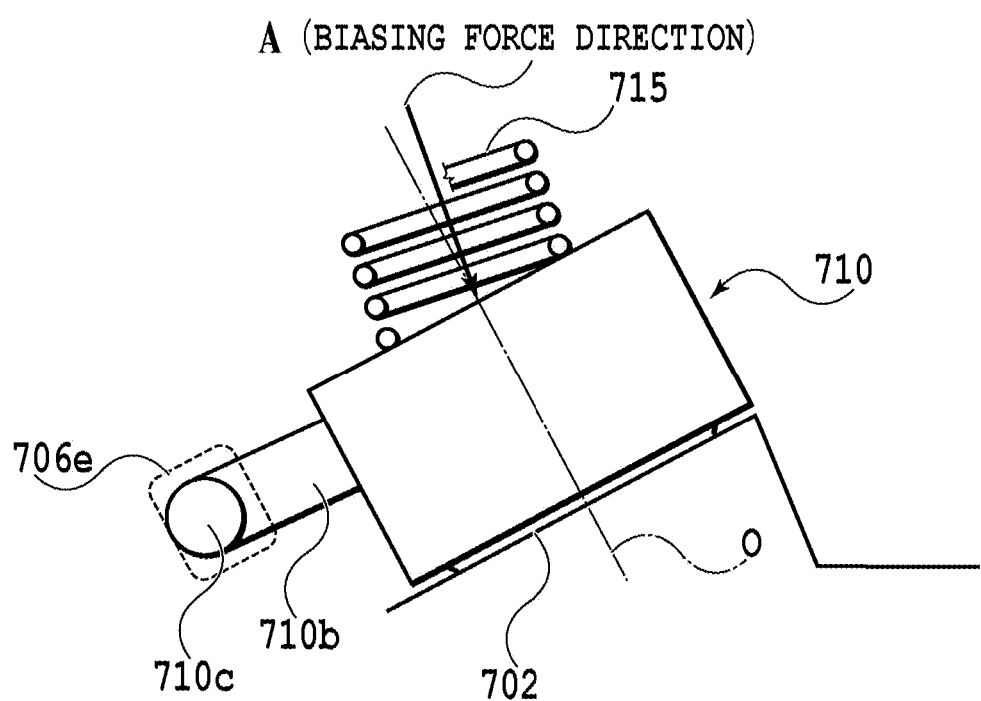
FIG. 13 illustrates a still another example of the retention mechanism of the back face CIS unit.

In the example of FIG. 13, an end of arm portion 710b of the back face CIS unit 710 has the axis portion 710c. The main frame 706 has the hole portion 706e fitted with the axis portion 710c. The back face CIS unit 710 can be rotated around a portion at which the axis portion 710c is fitted with the hole portion 706e. The position of the axis 710c is set so that, just before the guide face 702 is abutted to the back face CIS unit 710, the back face CIS unit 710 is moved in a direction substantially orthogonal to the guide face 702. The axis portion 710c is loosely fitted to the hole portion 706e with a predetermined play therebetween so as to absorb the tolerance or variation of components or to allow the back face CIS unit 710 to be smoothly rotated. When the pressure plate 40 is closed as shown in FIG. 1, the biasing force from the spring 715 biases the back face CIS unit 710 to be abutted to the guide face 702. During this, the direction A along which the spring 715 is biased is inclined from the axis line O in a direction orthogonal to the guide face 702. Thus, the biasing force from the spring 715 can be used to move the axis portion 710c of the back face CIS unit 710 to the upstream side of the manuscript conveying direction in the hole portion 706e. This can consequently provide a similar effect as in the above-described example.

Figure 14A:
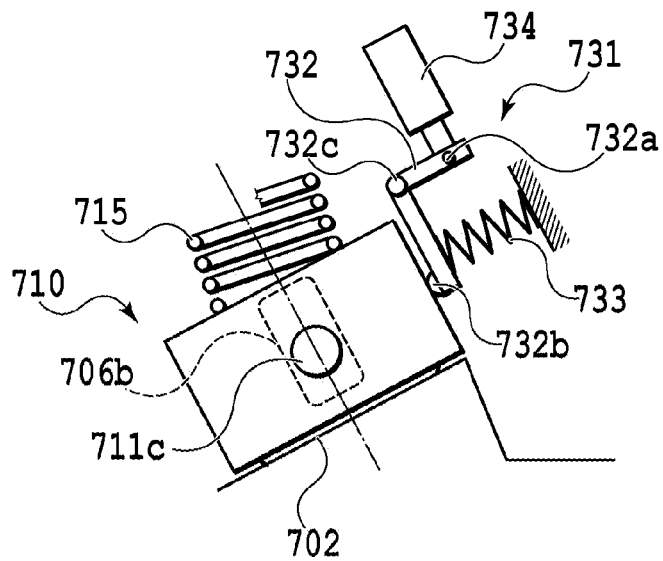
FIG. 14A and FIG. 14B illustrate a still another example of the retention mechanism of the back face CIS unit.
Figure 14B:
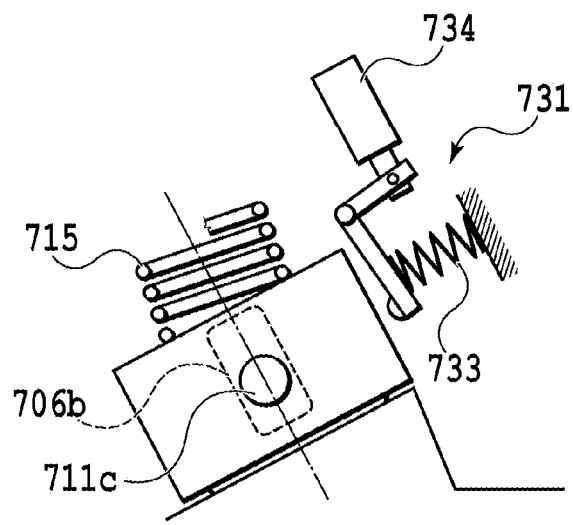
Figure 14C:
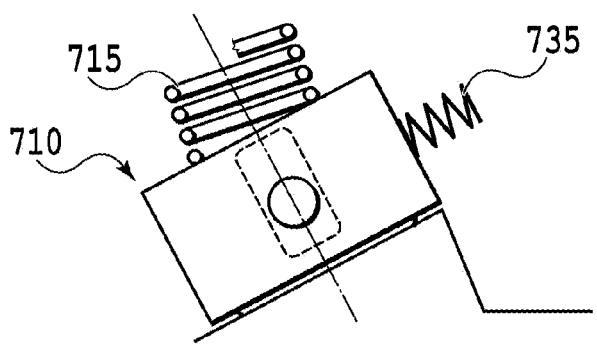
FIG. 14C illustrates a still another example of the retention mechanism of the back face CIS unit.

In the examples of FIG. 14A, FIG. 14B, and FIG. 14C, without using the springs 715 and 730, a component force is generated that is used to move the back face CIS unit 710 toward the one side of the hole portion 706b. A depression unit 731 is a unit that biases the back face CIS unit 710 from a side face. The side face of the back face CIS unit 710 has a lever member 732 that can be rotated around an axis 732c. The lever member 732 is biased by the spring 733 in the clockwise direction in the drawing. A solenoid plunger 734 connected to the one end 732a of the lever member 732 can be used to generate or cancel the biasing force (lateral pressure) to the back face CIS unit 710. When the pressure plate 40 is opened as shown in FIG. 5, the solenoid plunger 734 performs an absorbing operation as shown in FIG. 14B to overwhelm the biasing force of the spring 733 to rotate the lever member 732 in the counterclockwise direction. When the pressure plate 40 is closed as shown in FIG. 1 on the other hand, the absorbing operation of solenoid plunger 734 is cancelled as shown in FIG. 14A and the lever member 732 is rotated again in the clockwise direction to apply the lateral pressure to the back face CIS unit 710.

By the configuration as in this example, the long hole portion 706b and the guide unit of axial projection portion 711c can be prevented from having the backlash of the back face CIS unit 710. In order to apply the lateral pressure to the back face CIS unit 710, a member (spring 733) different from the spring 715 can be provided to increase the freedom for setting the magnitude of the lateral pressure. Furthermore, a configuration for switching the generation and cancelling of the lateral pressure to the back face CIS unit 710 is not limited to the one using the solenoid plunger 734. For example, a configuration using a link mechanism or a cam mechanism linked with the opening/closing of the pressure plate 40 may be used. So long as the sliding resistance of the long hole 706b and the axial projection portion 711c is within a range not suppressing the smooth oscillation of the back face CIS unit 710, a configuration as shown in FIG. 14C may be used in which a spring 735 is used to always apply the lateral pressure to the back face CIS unit 710.

(Structure for Positioning Back Face CIS Unit)

Next, the following section will describe a structure to position the back face CIS unit 710.

Figure 15A:
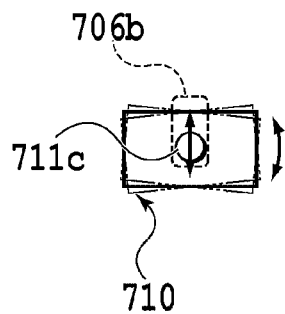
FIG. 15A, FIG. 15B, and FIG. 15C illustrate how the back face CIS unit moves.
Figure 15B:
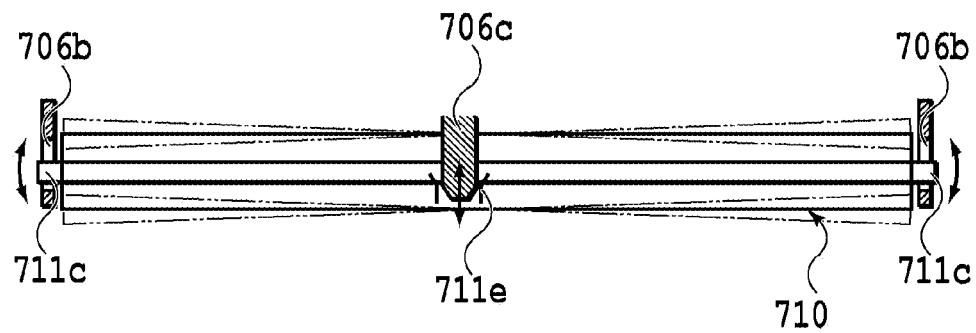
Figure 15C:
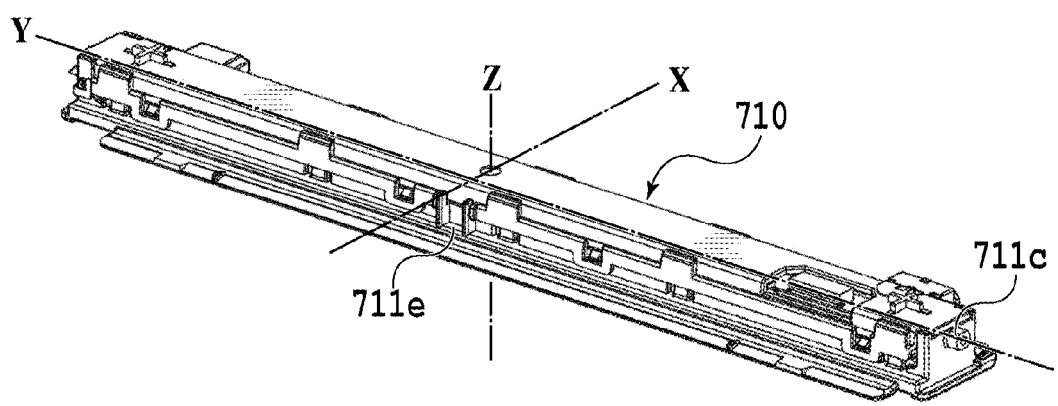

FIG. 15A, FIG. 15B, and FIG. 15C illustrate the freedom of the movement of the back face CIS unit 710 to the main frame 706. When the pressure plate 40 is opened as shown in FIG. 5, the guide unit 702 abutted to the protrusion 711d of the back face CIS unit 710 (see FIG. 9) is separated relatively. Thus, the back face CIS unit 710 is lowered due to the deadweight and the biasing force of the spring 715 until the axis portion 171c is abutted to the lower end of the long hole portion 706. In this lowering status, the back face CIS unit 710 can be moved as shown in FIG. 15A along the long hole portion 706 in the upper-and-lower direction and can be rotated around the axis portion 711c. As shown in FIG. 15B, the convex shape portion 706c for positioning the back face CIS unit 710 in the longer side direction has a tapered shape having a reduced front end. The concave shape portion 711e corresponding to the convex shape portion 706c has a tapered shape having a wider opening. Thus, when the back face CIS unit 710 is lowered, a portion at which the convex shape portion 706c is fitted to the concave shape portion 711e has a slight backlash. Thus, the back face CIS unit 710 can be moved as shown in FIG. 15B in the upper-and-lower direction and can be rotated around the portion at which the convex shape portion 706c is fitted to the concave shape portion 711e. The convex shape portion 706c and the concave shape portion 711e regulate the range within which the lowered back face CIS unit 710 can be moved.

As described above, as shown in FIG. 15C, the lowered back face CIS unit 710 has, with regard to the relation with the main frame 706, a freedom in the movement in a Z axis (virtual third axis line) direction, in rotation around a X axis (virtual first axis line), and in rotation in a Y axis (virtual second axis line). This freedom allows, when the pressure plate 40 is closed as shown in FIG. 1, the back face CIS unit 710 is securely positioned to the opposed guide unit 702. The back face CIS unit 710 also may be rotated by a predetermined angle around at least one of the X axis and the Y axis. The predetermined angle is preferably smaller than 15 degrees.

Figure 16:
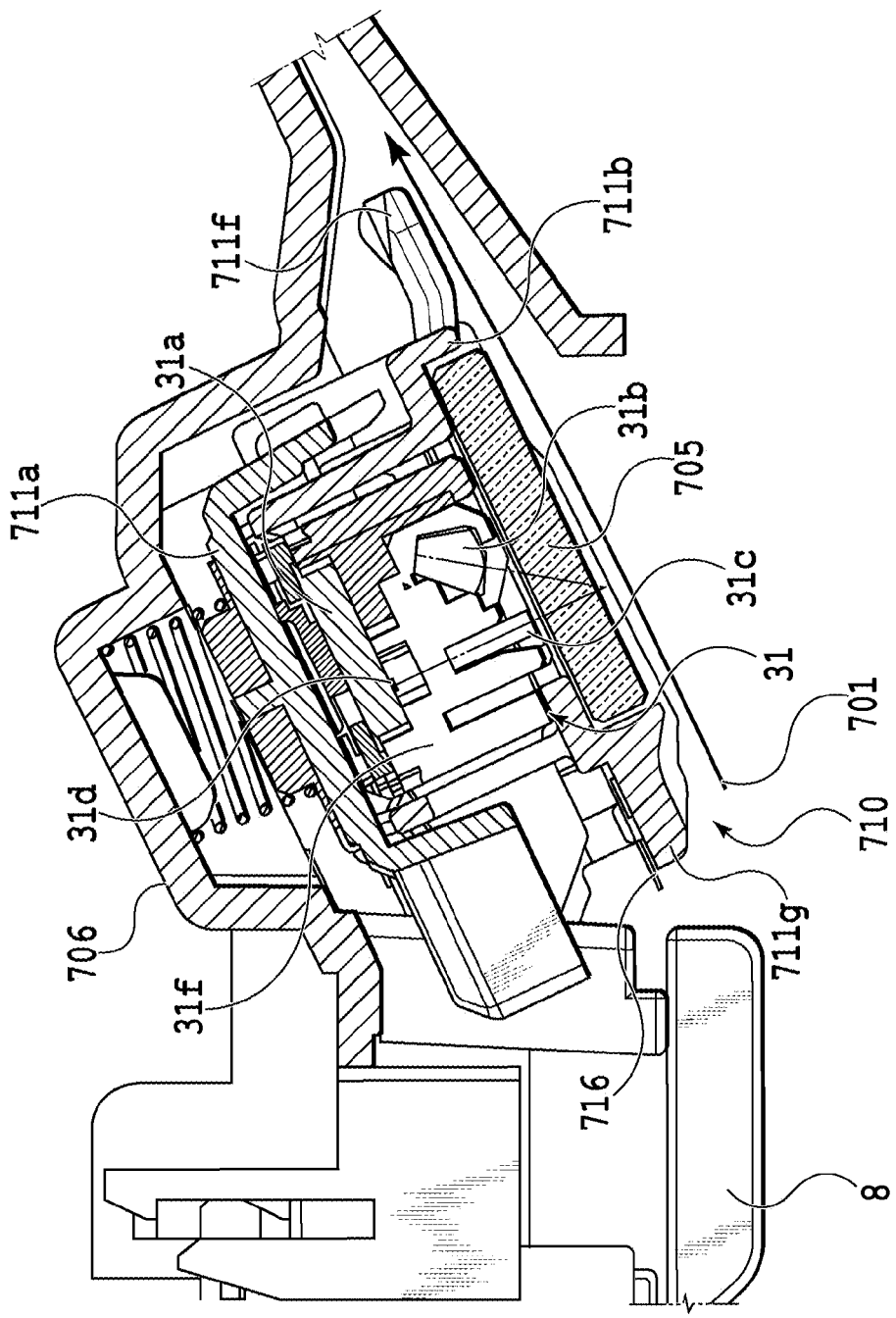
FIG. 16 is a cross-sectional view illustrating the back face CIS unit.

FIG. 16 is a cross-sectional view illustrating the back face CIS unit 710. The control substrate 31a controls the operation of the back face reading CIS 31. A light guide structure 31b guides light from an LED (not shown) functioning as a light source provided at an end in the longer side direction of the CIS 31 to the manuscript face and a SELFOC lens array 31c collects the reflected light from the manuscript face. The collected reflected light is received by a sensor chip 31d functioning as a light-receiving unit mounted on the control substrate 31a. An optical signal is converted to an electrical signal. The light guide structure 31b, the SELFOC lens array 31c, and the sensor chip 31d are a component group arranged at the longer side that is configured over the entire manuscript width in order to read the image information on the manuscript face and are attached to a CIS frame 31f constituting the housing of the CIS 31.

The back face CIS unit 710 is configured so that the most part except for the glass 705 is formed by resin components. The glass 705 has a higher specific gravity than that of resin and is provided at the lower side of the back face CIS unit 710. Thus, a gravity center in the cross section of the back face CIS unit 710 is in the vicinity of the glass 704 in FIG. 16. Thus, when the pressure plate 40 is opened, the back face CIS unit 710 has a force that causes the back face CIS unit 710 to start rotating in the clockwise direction in FIG. 15A. An end 711f of the back face CIS unit 710 is protruded as shown in FIG. 16 in the conveying path 701. The end 711f functions as a regulating member for regulating the rotation of the back face CIS unit 710. In this example, the back face CIS unit 710 is configured to have a freedom in rotation of ±5 degrees around the Y axis.

FIG. 17 to FIG. 21B illustrate the back face CIS unit 710 when the pressure plate 40 is closed.

When the pressure plate 40 is gradually closed from the opened status as shown in FIG. 5, then the manuscript reading conveying unit 1 and the book manuscript reading unit 2 are closer to each other as shown in FIG. 17. During this, the back face CIS unit 710 is in the lowered status as described above and is rotated due to the eccentrically-located gravity center so that the downstream side of the back face CIS unit 710 in the conveying direction of the manuscript is lowered. The pressure plate 40 is rotated around the pivot point of the hinges 42 and 43. Thus, the back face CIS unit 710 being lowered while slightly rotating as described above is abutted to the guide unit 702 so that the guide unit 702 is firstly abutted to the a part of the downstream side in conveying direction in the projection portion 711d positioned at the rear side (a side having the hinges 42 and 43).

Figures 19A, 19B:
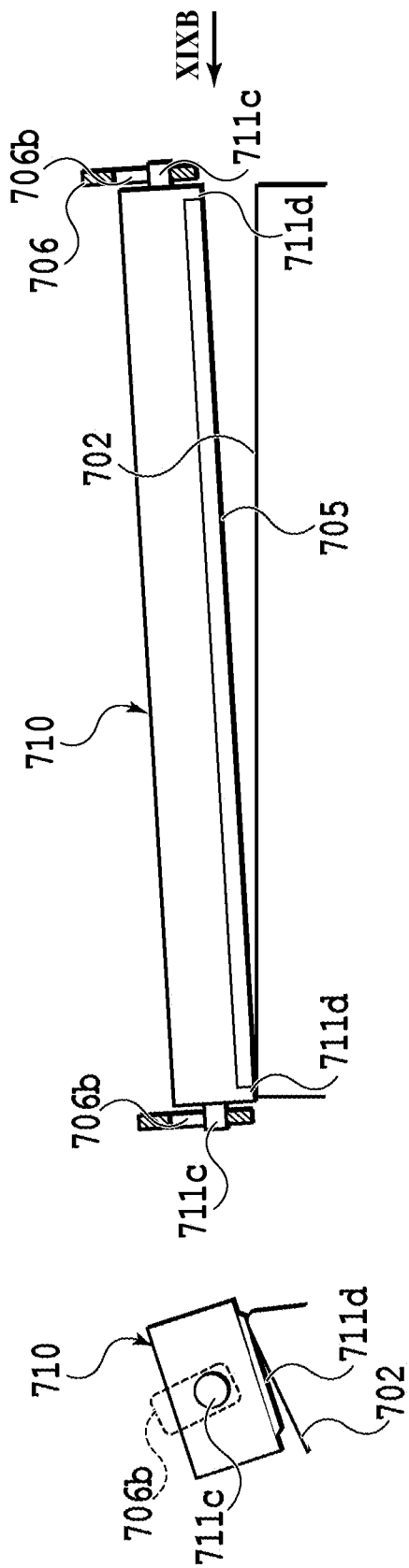
FIG. 19A and FIG. 19B illustrate the automatic paper feeding pressure plate in the middle of the closing operation.
Figures 20A, 20B:
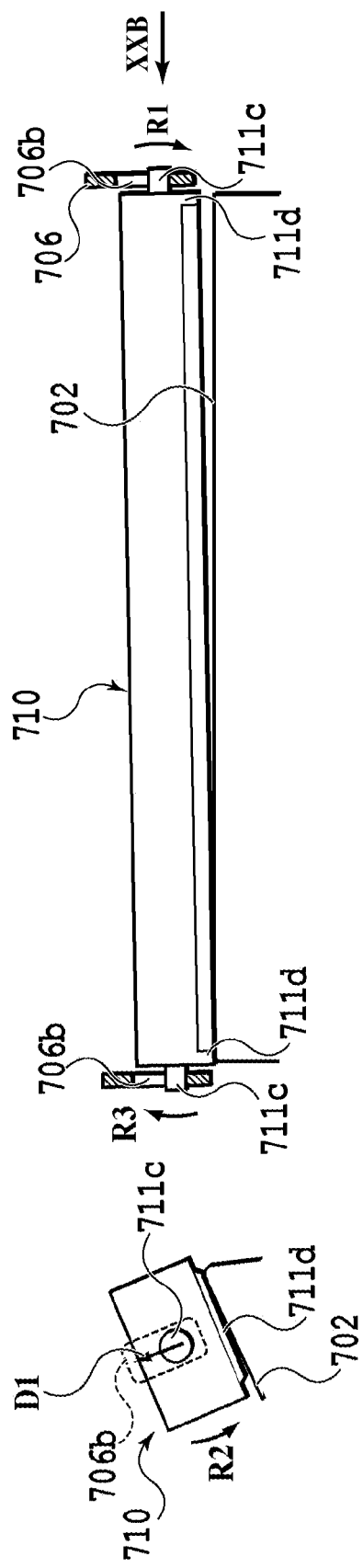
FIG. 20A and FIG. 20B illustrate the automatic paper feeding pressure plate in the middle of the closing operation.
Figures 21A, 21B:
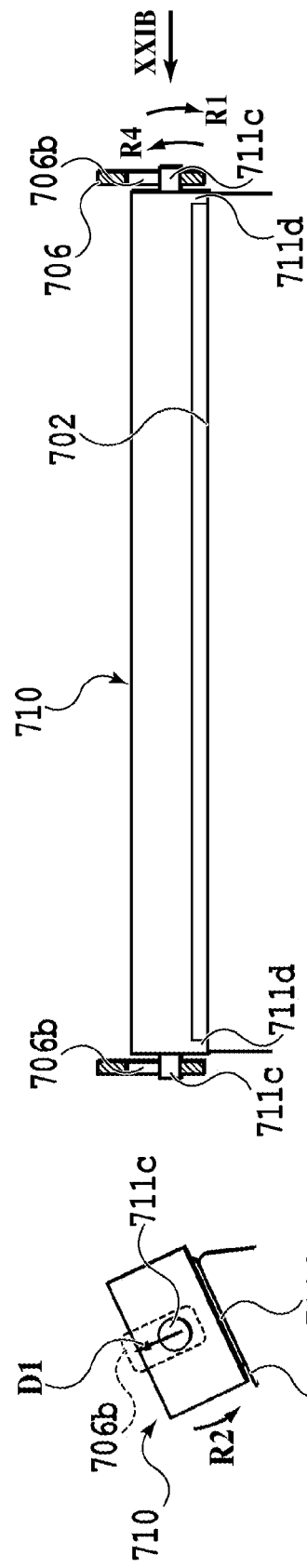
FIG. 21A and FIG. 21B illustrate the automatic paper feeding pressure plate when the closing operation is completed.

Furthermore, by closing the pressure plate 40 from this status, as shown in FIG. 19A to FIG. 21B, the back face CIS unit 710 is aligned to the guide face 702. FIG. 19A, FIG. 20A, and FIG. 21A are schematic views seen in the conveying direction of the manuscript. FIG. 19B, FIG. 20B, and FIG. 21B are arrow views at XIXB, XXB, and XXIB of FIG. 19A, FIG. 20A, and FIG. 21A.

The back face CIS unit 710 in the status of FIG. 19A and FIG. 19B is configured so that the projection portion 711d of the rear side (the left side in FIG. 19A) is abutted to the guide unit 702. As shown in FIG. 20A and FIG. 20B, the pressure plate 40 is further closed in the direction of an arrow R1 around the pivot points of the hinges 42 and 43. Thus, the back face CIS unit 710 is configured so that, while the projection portion 711d of the rear side is abutted to the guide 702, the axis portion 711c of the rear side is raised within the long hole portion 706b. As a result, the back face CIS unit 710 is rotated in the direction of an arrow R3 around the X axis as described above. The back face CIS unit 710 is also rotated in the direction of an arrow R2 around the Y axis to have a reduced angle to the guide face 702. As shown in FIG. 21A and FIG. 21B, the pressure plate 40 is further closed in the direction of the arrow R1 around the pivot points of the hinges 42 and 43. As a result, the projection portion 711d of the front side (the right side in FIG. 21A) of the back face CIS unit 710 is abutted to the guide unit 702, the back face CIS unit 710 is rotated in the direction of the arrow R4 around the X axis, and the axis portion 711c at the front side is raised within the long hole portion 706b. The back face CIS unit 710 is further rotated in the R2 direction around the Y axis and the entire face of the projection portions 711d of the rear side and the front side are finally abutted to the guide unit 702. As a result, the back face CIS unit 710 is positioned to be parallel to the guide unit 702. Specifically, the back face CIS unit 710 is corrected to have a positioning posture along a reference plane in the guide unit 702.

As described above, the back face CIS unit 710 is configured so that the closing of the pressure plate 40 causes the downstream side of the projection portion 711d positioned at the rear side to be firstly abutted to the guide unit 702. Thereafter, the back face CIS unit 710 moves in the Z axis direction while being rotated around the X axis and Y axis and is finally corrected to have a correct posture along the guide unit 702 to reach a positioning posture. The CIS 31 of the back face CIS unit 710 is a sensitive electric component. Thus, when a high impact is applied, the sensor chip 31d may have a crack or may be peeled from the substrate 31a. To prevent this, such a configuration is preferred that suppresses, when the pressure plate 40 is closed, the back face CIS unit 710 from receiving an impact causes by the collision of the back face CIS unit 710 against the guide unit 702. As described above, the pressure plate 40 is closed with the rotation around the X axis and Y axis and the movement in the Z axis direction. Thus, when compared with a configuration no using such rotations, an impact caused by the collision of the back face CIS unit 710 against the guide unit 702 can be dispersed. Furthermore, a position at which the back face CIS unit 710 is firstly abutted to the guide unit 702 is set to a position away from an end of the substrate 31*a* having thereon the sensor chip 31*d*. Thus, the rigidity of the substrate 31*a* is prevented from transmitting the impact to the sensor chip 31*d*.

(Hinge Configuration)

In this example, the hinge 42 positioned at the right side of the apparatus body has a damper function provided by a configuration of a spring and a cam member (not shown). Thus, the hinge 42 is configured so that, even when the operator removes his or her hand from the opened pressure plate 40, the pressure plate 40 is prevented from being immediately closed. On the other hand, the hinge 43 positioned at the left side of the apparatus body does not have such a damper function and is merely configured as a pivot point around which the pressure plate 40 is rotated. Generally, a hinge having a damper mechanism using a spring and a cam member is configured to have a cam shape so that the closing of the pressure plate is securely completed by allowing the pressure plate to have no more damping force immediately before the completion of the closing of the pressure plate to allow the pressure plate to be closed due to the deadweight of the pressure plate. Although the pressure plate drops due to the deadweight for over a short distance, the pressure plate inevitably collides against the book manuscript reading unit at a certain level.

As described above, in this example, the hinge 43 positioned closer to the manuscript reading conveying unit 1 (the left side of the apparatus body) does not have the damper function and the hinge 42 positioned at the side away from the manuscript reading conveying unit 1 (the left side of the apparatus body) has the damper function. Thus, the pressure plate 40 is configured so that, when the pressure plate 40 is being closed, the deflection due to the deadweight of the pressure plate 40 causes a part at the hinge 43 side having no damper function is firstly lowered. As described above, the pressure plate 40 is configured so that the pressure plate 40 is completely closed at different timings at the left and right sides. In this example, the damping force and the cam shape are set so that, while the braking by the damper function of the hinge 42 is being effective, the left side of the pressure plate 40 (the side at which the manuscript reading conveying unit 1 is positioned) is closed. Specifically, the pressure plate 40 is configured so that the pressure plate 40 drops due to the deadweight after the closing of the left side of the pressure plate 40. This can consequently reduce the impact applied to the back face CIS unit 710. Furthermore, in this example, only one of the two hinges 42 and 43 is allowed to have a damper function. However, another configuration may be used in which both of these hinges have a damper function so that one hinge has a reduced damping force or the respective hinges have different cam shapes to provide different timings at which the damping force is no more effective. This configuration also can provide a similar effect.

Figure 22A:
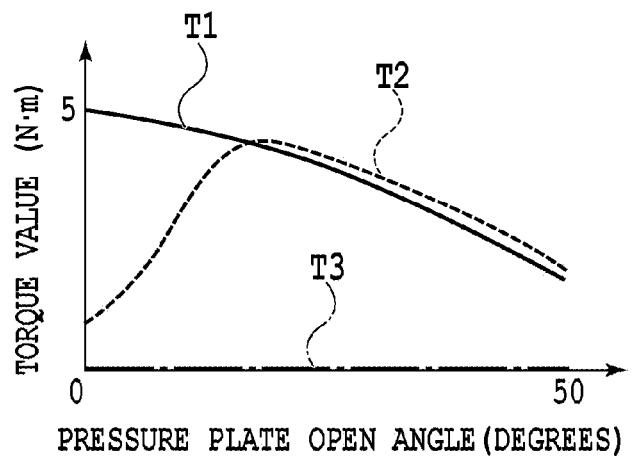
FIG. 22A, FIG. 22B, and FIG. 22C illustrate damping forces of different hinges for supporting the automatic paper feeding pressure plate.
Figure 22B:
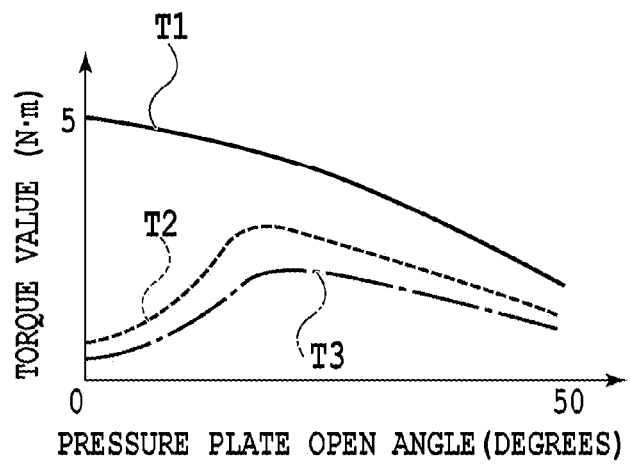
Figure 22C:
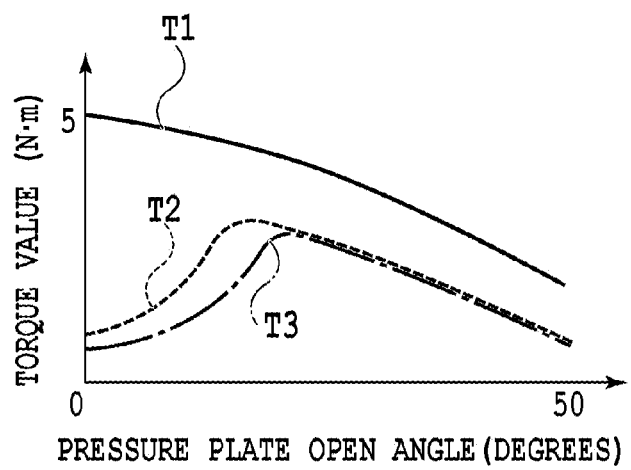

FIG. 22A, FIG. 22B, and FIG. 22C are graphs illustrating the relation, in different configurations of the hinges 42 and 43, between the rotation torque caused by the deadweight of the pressure plate 40 acting on the hinges and the rotation torque caused by the spring force of the hinges. In these graphs, the horizontal axis represents the open/close angle of the pressure plate 40 and the vertical axis represents the rotation torque (N·m). The rotation torque due to the deadweight of the pressure plate 40 is applied in a positive direction along which the pressure plate 40 is closed. The rotation torque due to the spring force of the hinges is applied in a positive direction along which the pressure plate 40 is opened. The solid lines in FIG. 22A, FIG. 22B and FIG. 22C represent a rotation torque T1 due to the deadweight of the pressure plate 40. The pressure plate 40 of this example has a weight of about 2.5 kg. The rotation torque T1 acting on the hinge center draws a curve providing 5 N·m at a maximum. The dotted line shows a rotation torque T2 of the hinge 42. The dashed-dotted line shows a rotation torque T3 of the hinge 43.

In the examples of FIG. 22A, FIG. 22B, and FIG. 22C, as described above, the hinge 43 side in the pressure plate 40 is firstly closed to reduce the impact applied to the back face CIS unit 710. In the example of FIG. 22A, only the hinge 42 has a damper mechanism using a spring and a cam member. The other hinge 43 has not braking force and thus does not generate the rotation torque T3. The hinge 42 is configured, depending on the shape of the cam member, so that the rotation torque T2 is reduced in accordance with an increase of the open angle of the pressure plate 40 from about 15 degrees. Immediately before the completion of the closing of the pressure plate 40, the rotation torque T1 due to the deadweight of the pressure plate 40 and the rotation torque T2 due to the spring force of the hinge 42 are balanced so that a free stop can be achieved.

In the example of FIG. 22B, the hinges 42 and 43 both have a damper mechanism. The timing at which the rotation torques T2 and T3 of the hinges 42 and 43 start declining the same as that of the example of FIG. 22A. However, since different spring loads are provided to the hinges 42 and 43 in the damper mechanism, different braking forces are provided therefrom. In the example of FIG. 22C, the hinges 42 and 43 have damper mechanisms, respectively, and these damper mechanisms have the same spring load. However, the shapes of the cam members are set so that the torque T3 of the hinge 43 starts declining sooner among the rotation torques T2 and T3.

(Neutralization Structure)

The CIS functioning as a unit to read an image must consider the breakage due to static electricity in addition to the external force such as an impact as described above. For example, a dry room has a risk where the CIS may be broken due to the static electricity over a manuscript. The back face CIS unit 710 in this example is provided to be exposed when the pressure plate 40 is opened. This is to allow an operator to easily access the back face CIS unit 710 when jamming occurs or when the white reference sheet 703 and the glass 705 must be cleaned. On the other hand, such an exposure may cause, during cleaning or jam handling as described above, the CIS to be broken due to the static electricity over the cloth of the operator.

Figure 23:
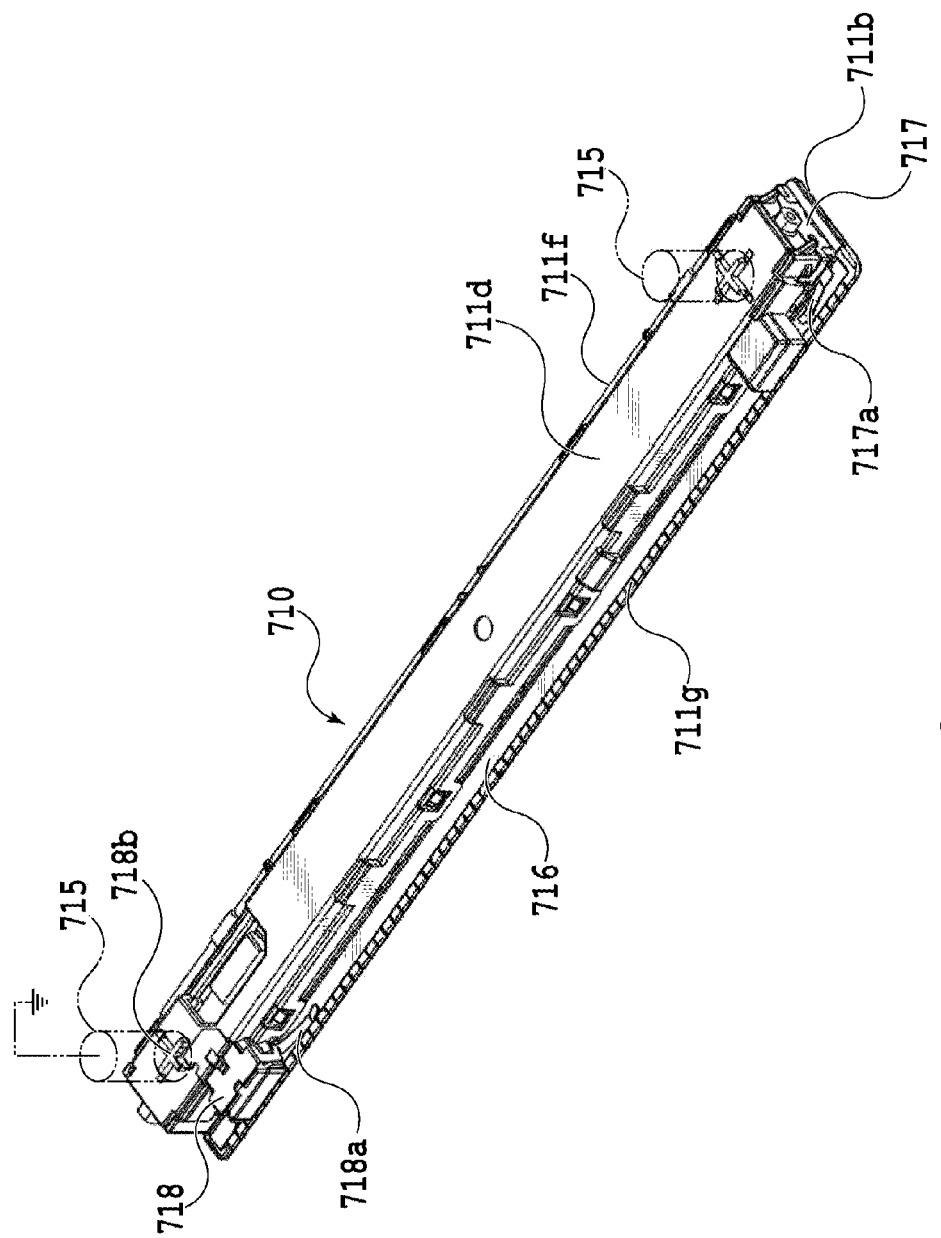
FIG. 23 is a perspective view illustrating the back face CIS unit.

FIG. 23 is a perspective view illustrating the neutralization structure in the back face CIS unit 710.

A roof portion 711*g* is protruded from the upstream side, in the conveying direction of the manuscript, of the lower case 711*b* over the entire width range of the manuscript. The roof portion 711*g* is configured so that the paper feed face side opposed to the manuscript functions as a guide face to guide the manuscript along the conveying path 701. A neutralization brush (neutralization member) 716 is adhered over the entire width range of the manuscript at the non paper feed face side of the roof portion 711*g* (an opposite side of the paper feed face side). The neutralization brush 716 is configured by adhering conductive fiber bundles to an aluminium tape at a predetermined interval. The brush 716 is provided in a direction substantially parallel to the conveying path 701 and the front end faces the upstream side of the conveying path 701.

An end of the lowercase 711A is attached with a plate spring 717. A one end 717*a* of the plate spring 717 is abutted to the aluminium tape of the neutralization brush 716 to provide electrical conduction therebetween. A side of the back face CIS unit 710 to which the plate spring 717 is attached has an LED chip (not shown) as a light source. The plate spring 717 functions as a lightning rod to prevent the LED from receiving static electricity. The upper case 711a is attached with a plate spring 718 and a one end 718a of the plate spring 718 is abutted to the aluminium tape of the neutralization brush 716 to provide electrical conduction therebetween. The other end 718b of the plate spring 718 contacts with the spring 715 for biasing the back face CIS unit 710 to the guide unit 702 to provide electrical conduction therebetween. An end of the spring 715 is connected to a ground cable via a plate spring (not shown) and is also connected to the frame ground of the apparatus for electrical grounding.

As described above, the plate spring 717, the neutralization brush 716, the plate spring 718, and the spring 715 are electrically connected to ground. The neutralization brush 716 is adhered to the non paper feed side of the roof portion 711 and is positioned to have a predetermined distance from the conveying path 701 so that the brush portion does not intrude into the paper feed region. As a result, the brush portion of the neutralization brush 716 is prevented from touching the manuscript in the conveying path 701 and the static electricity caused over the manuscript is discharged to the neutralization brush 716 due to aerial discharge. Since the brush portion of the neutralization brush 716 is prevented from touching the manuscript, there is no risk where the manuscript conveying resistance due to the touch therebetween causes an inclined manuscript. As shown in FIG. 16, the neutralization brush 716 is provided between the conveying path 701 and the control substrate 31a of the CIS 31. As a result, even when static electricity is discharged from the manuscript being conveyed (or midst of paper passing) through the conveying path 701 or from a hand of an operator handling a jammed manuscript for example, the neutralization brush 716 functions as a lightning rod to receive the static electricity and the static electricity escapes to the ground. Thus, the substrate 31a having thereon the sensor chip 31d can be prevented from being broken due to static electricity.

Since the neutralization brush 716 is adhered to the roof portion 711g of the back face CIS unit 710, the paper feed face side of the roof portion 711g forming the conveying path 701 as well as the neutralization brush 716 and the control substrate 31a always have the same positional relation therebetween. Thus, the neutralization brush 716 can always keep a lightning rod function constant. Furthermore, the reading white plate 8, which functions to depress a manuscript when the image information on the top face of the manuscript is read, is formed by resin of a conductive grade (top face specific resistance value: about $13^{th}$ power of $1\times10\Omega$ to $15^{th}$ power of $1\times10$) in order to remove the static electricity caused over the manuscript. Thus, the static electricity caused between the reading white plate 8 and the manuscript being fed is suppressed from causing the reading white plate 8 to be attracted to the manuscript.

On the other hand, when many manuscripts are conveyed (or fed) via the conveying path 701 or when the manuscript is fed in a dry environment, friction between the ADF glass 23 and the manuscript may cause a risk where the manuscript is electrical-charged and is attracted to the glass 23. In such a case, the manuscript may be prevented from being smoothly moved to an inclined portion for scooping the manuscript from the glass 23, which may cause an inclined manuscript or a jammed manuscript. Furthermore, another risk may be caused where the reading white plate 8 is electrical-charged when many manuscripts are fed or when the manuscript is fed in a dry environment. According to this example, the neutralization brush 716 provided at the inner side of the inclined portion of the conveying path 701 is used to discharge the electric charge between the glass 23 and the manuscript and the electric charge over the reading white plate 8. This can consequently reduce the conveying resistance of the manuscript due to static electricity thereby stabilize the conveying accuracy.

By increasing the length of the brush of the neutralization brush 716 to allow the brush to be abutted to the reading white plate 8, the neutralization efficiency to the manuscript can be increased to achieve both of the prevention of the electrical charge of the manuscript and the prevention of the electrostatic breakdown of an electric element.

Another Example of Neutralization Structure

Figure 24:
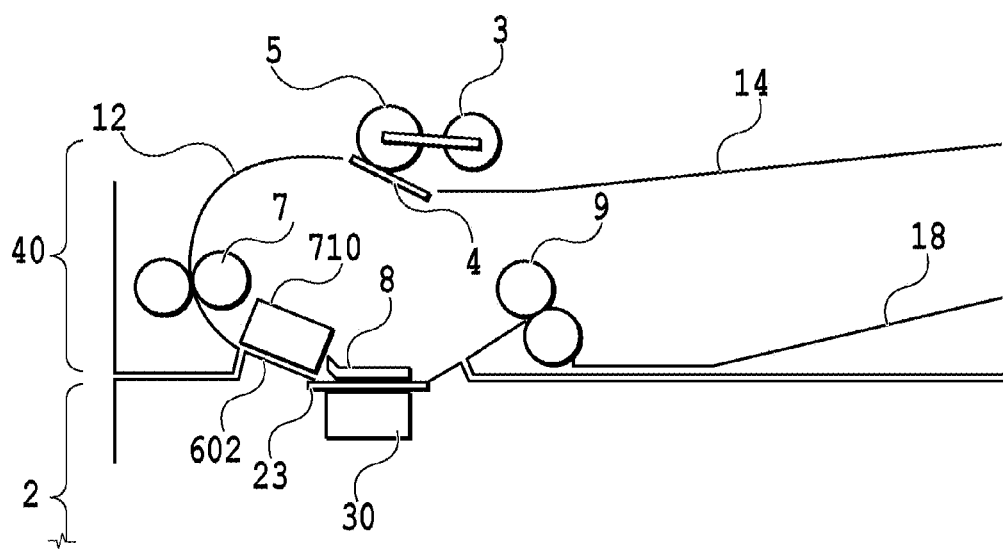
FIG. 24 illustrates another example of a neutralization structure in the back face CIS unit.
Figure 25:
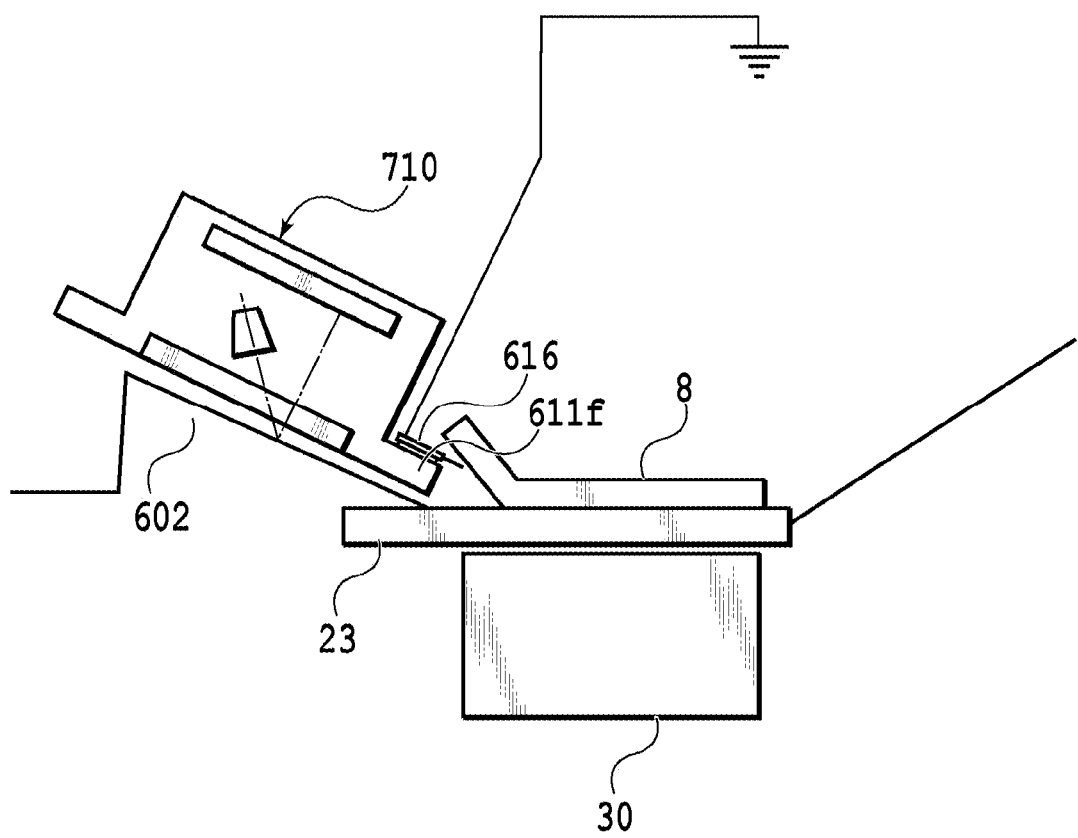
FIG. 25 illustrates another example of the neutralization structure in the back face CIS unit.

Next, with reference to FIG. 24 and FIG. 25, the following section will describe another example of the neutralization structure in the back face CIS unit 710. In these drawings, the same parts as in the above examples are denoted with the same reference numerals and will not be described further.

In this example, as shown in FIG. 24, the back face CIS unit 710 for reading the image information on the back face of the manuscript is provided at the upstream side in the conveying direction of the manuscript than the CIS 30 for reading the image information on the top face of the manuscript. The back face CIS unit 710 is provide at an exit side of the U turn path 12 in the manuscript reading conveying unit 1 and is moved in accordance with the opening and closing of the pressure plate 40. A guide unit 602, which is positioned at an opposite side of the back face CIS unit 710, functions as a reference plane to read the manuscript. The guide unit 602 functions as a reference plane to regulate the posture of the back face CIS unit 710 when the back face CIS unit 710 is closed. The guide unit 602 also functions as a guide face to smoothly guide the manuscript to the glass 23 and thus is inclined to the glass 23. The guide unit 702 is provided in the book manuscript reading unit 2. When the pressure plate 40 is opened, the guide unit 602 is separated from the manuscript reading conveying unit 1 to thereby expose the back face CIS unit 710.

In FIG. 25, a neutralization brush 616 is provided at the downstream side in the conveying direction in the back face CIS unit 710. The neutralization brush 616 is configured, as in the neutralization brush 716 in the above-described example, to be grounded via a metal component such as a plate spring. A front end of the neutralization brush 616 is positioned at a bent portion of a path for conveying the manuscript. A roof-shaped portion 611f is provided at the downstream side in the conveying direction in the back face CIS unit 710. A lower face of the roof-shaped portion 611f has a paper feed face for guiding the manuscript. The neutralization brush 616 is provided at the upper side of the roof-shaped portion 611f (i.e., non paper feed face side) and is positioned to have a predetermined distance from the paper feed face of the roof-shaped portion 611f. The CIS 30 for reading the image information on the top face of the manuscript is provided at the downstream side in the conveying direction in the back face CIS unit 710. In the vicinity of the neutralization brush 616, a reading white plate 8 is provided that is used to depress the manuscript to the CIS 30.

The configuration as described above protects, as in the above-described example, the CIS in the back face CIS unit 710 from the static electricity caused in the manuscript being conveyed and also can avoid a defective conveyance of the manuscript caused when the manuscript touches the neutralization brush 616. Furthermore, when an operator accesses the back face CIS unit 710 in order to handle a jammed manuscript or to clean the interior, the neutralization brush 616 functions as a lightning rod to prevent electrostatic breakdown. Furthermore, the neutralization brush 616 provided at the inner side of the bent portion of the manuscript conveying path also can be used to cause the aerial discharge of the electric charge caused between the glass 231 and the manuscript to reduce the manuscript conveying resistance due to the static electricity to thereby stabilize the conveying accuracy.

When the back face CIS unit is provided between the separation roller 5 and the first conveying roller 7, a configuration as described below can provide a similar neutralization effect. Specifically, at the downstream side of the back face CIS unit in the conveying direction, a neutralization brush is provided to be separated from the manuscript conveying path and to be extended toward the conveying direction so as to be substantially parallel to the conveying path. This configuration not only can protect the CIS of the back face CIS unit from the static electricity caused over the manuscript being conveyed but also can protect the CIS from external static electricity when the ADF cover unit 712 is opened in order to perform a jammed manuscript handling or a cleaning. Furthermore, since the front end of the neutralization brush is protruded to the U turn path 12, the static electricity caused by the friction between the U turn path 12 and the manuscript can be discharged into air to reduce the manuscript conveying resistance.

Another Example of the Positioning Structure of the Back Face CIS Unit

Figure 26A:
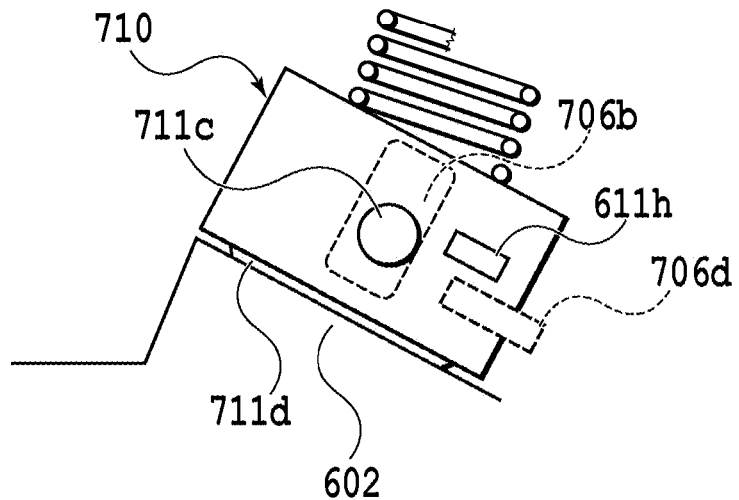
FIG. 26A and FIG. 26B illustrate another example of a positioning structure of the back face CIS unit.
Figure 26B:
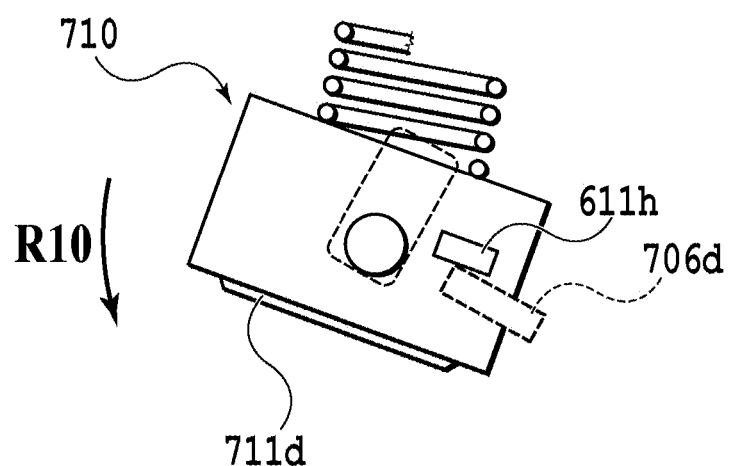

FIG. 26A and FIG. 26B illustrate another example of the positioning structure of the back face CIS unit 710.

When the pressure plate 40 is opened as shown in FIG. 5, the axis portion 711c is moved along the long hole portion 706b and the back face CIS unit 710 is lowered as shown in FIG. 26B. During this, protruded portions 611h provided at both ends of the back face CIS unit 710 in the longer side direction are abutted to stopper walls 706d provided in the main frame 706. Consequently, the lowering of the right part in the back face CIS unit 710 in FIG. 26B is regulated and the back face CIS unit 710 is rotated in a direction shown by an arrow R10. As a result, when the back face CIS unit 710 is lowered completely, the back face CIS unit 710 is inclined as shown in FIG. 26B. The configuration as described above can control, even when the back face CIS unit 710 does not have an eccentric gravity center as in the above-described example, the posture of the back face CIS unit 710 when the pressure plate 40 is opened. When the pressure plate 40 is closed from the status of FIG. 26B, the guide unit 602 is firstly abutted to apart at the upstream side in conveying direction in the projection portion 711d positioned at the rear side of the back face CIS unit 710. Thereafter, as in the case of the above-described case, the back face CIS unit 710 is moved in the z axis direction while rotating around the X axis and the Y axis. Finally, the entire projection portions 711d at the rear side and the front side are abutted to the guide unit 702. The configuration as described above can reduce the impact force applied to the back face CIS unit 710.

According to the embodiment described above, the reading sensor is retained so that the reading sensor can have a corrected posture when the openable and closable unit is closed, thereby reducing the impact applied to the reading sensor by a simple configuration. Furthermore, the impact applied to the reading sensor can be reduced without requiring a special box-like sensor retention unit or impact-absorbing member for example, thus downsizing and weight reduction of the openable and closable unit or the entire apparatus can be achieved. This can consequently reduce packaging components or packaging materials to reduce the component cost and logistic cost.

The above-described embodiment is an example for an image reading apparatus provided in an inkjet printing apparatus. However, the image reading apparatus of the present invention also may be configured as an OA machine (e.g., an OA device such as a document scanner exclusively used for reading) and also may be combined with an image printing apparatus or a communication apparatus to configure an MFP (multifunctional peripheral apparatus) such as a copier or a facsimile.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-169768, filed Aug. 22, 2014, which is hereby incorporated by reference wherein in its entirety.

What is claimed is:

1. An image reading apparatus, comprising:
    a first reading unit having a flat-bed scanner with a platen surface on which a document is placed, the first reading unit further having a guide face being inclined with respect to the platen surface, and
    a second reading unit having a document feeder and a line image sensor to read a fed document, the second reading unit being closable and openable with respect to the platen surface of the first reading unit,
    wherein the line image sensor is retained flexibly in the second reading unit such that a posture of the line image sensor is changed to follow the guide face by contacting with the guide face when the second reading unit is closed, and such that the line image sensor is separated from the guide face when the second reading unit is opened, and
    wherein the line image sensor is retained to be rotatable with regard to at least a first axis parallel to a longer side direction of the line image sensor.

2. The image reading apparatus according to claim 1, wherein the guide face is provided on the platen surface and is inclined to have an angle of 25 degrees plus or minus 5 degrees with respect to the platen surface.

3. The image reading apparatus according to claim 1, wherein the line image sensor is retained to be rotatable with regard to a second axis orthogonal to the first axis and to be movable in a third axis direction orthogonal to a plane including the first and the second axes.

4. The image reading apparatus according to claim 1, wherein the line image sensor is a contact image sensor unit having a sensor elements array and an illuminating element.

5. The image reading apparatus according to claim 1, wherein the second reading unit comprises a biasing portion that applies a biasing force to the line image sensor at least in a direction in which the line image sensor is abutted to the guide face, and
    the biasing force is eccentrically-located in at least in a direction parallel to a longer side direction of the line image sensor.

6. The image reading apparatus according to claim 1, wherein the line image sensor urged by the guide face rotates at an angle smaller than 15 degrees with respect to the first axis when the second reading unit is closed.

7. The image reading apparatus according to claim 1, wherein the line image sensor is provided on a substrate, and
   a distance between one end of the substrate in the a direction of document feeding and the line image sensor is longer than a distance between the other end of the substrate and the line image sensor, and
   a part at which the line image sensor to the guide face contacts first while closing the second reading unit is positioned at a side corresponding to the one end of the substrate.

8. The image reading apparatus according to claim 1, wherein the second reading unit includes a neutralization brush not touching a document being fed.

9. The image reading apparatus according to claim 1, wherein the second reading unit further comprises a biasing portion that applies a biasing force to the line image sensor toward the guide face, the biasing portion applies the biasing force so as to urge the line image sensor toward a lower side of the inclination of guide face in the gravity direction.

10. An image reading apparatus, comprising:
    a first reading unit having a flat-bed scanner with a platen surface on which a document is placed, the first reading unit further having a guide face being inclined with respect to the platen surface, and
    a second reading unit having a document feeder and a line image sensor to read a fed document, the second reading unit being closable and openable with respect to the platen surface of the first reading unit,
    wherein the line image sensor is retained flexibly in the second reading unit such that a posture of the line image sensor is changed to follow the guide face by contacting with the guide face when the second reading unit is closed, and such that the line image sensor is separated from the guide face when the second reading unit is opened, and
    wherein the second reading unit is supported with hinges to be rotatable with respect to the first reading unit around an axis orthogonal to a direction in which the line image sensor is extending.

11. The image reading apparatus according to claim 10, wherein the hinges comprise a first hinge and a second hinge, and
    the first hinge is positioned closer to the line image sensor than the second hinge and has a damping force lower than that of the second hinge.

12. The image reading apparatus according to claim 10, wherein the hinges comprise a first hinge and a second hinge, and
    the first hinge is positioned closer to the line image sensor than the second hinge and has a damper force reduced sooner than the second hinge while closing the second reading unit.

13. An image reading apparatus, comprising:
    a first reading unit having a flat-bed scanner with a platen surface on which a document is placed, the first reading unit further having a guide face being inclined with respect to the platen surface, and
    a second reading unit having a document feeder and a line image sensor to read a fed document, the second reading unit being closable and openable with respect to the platen surface of the first reading unit, wherein the line image sensor contacts with the guide face when the second reading unit is closed, and the line image sensor being separated from the guide face when the second reading unit is opened,
    wherein the second reading unit comprises a biasing portion that applies a biasing force to the line image sensor toward the guide face, the biasing portion applies the biasing force so as to urge the line image sensor toward a lower side of the inclination of the guide face in the gravity direction.

14. The image reading apparatus according to claim 13, wherein the biasing portion comprises a spring, and
    when the second reading unit is closed, a direction in which the biasing force applied by the spring is inclined with respect to a direction orthogonal to the guide face, or a face of the line image sensor onto which the biasing force applied by the spring is inclined with respect to the guide face, thereby the biasing force urges the line image sensor toward the lower side of the inclination of the guide face.

\* \* \* \* \*